(12) United States Patent
Kabra et al.

(10) Patent No.: US 10,360,398 B2
(45) Date of Patent: Jul. 23, 2019

(54) SECURE DISK ACCESS CONTROL

(71) Applicant: McAfee, LLC, Plano, TX (US)

(72) Inventors: Atul Kabra, New Delhi (IN); Michael Hughes, San Francisco, CA (US); John Teddy, Portland, OR (US)

(73) Assignee: McAfee, LLC, Santa Clara, CA (US)

( * ) Notice: Subject to any disclaimer, the term of this patent is extended or adjusted under 35 U.S.C. 154(b) by 0 days.

(21) Appl. No.: 15/614,836

(22) Filed: Jun. 6, 2017

(65) Prior Publication Data

US 2018/0089457 A1 Mar. 29, 2018

Related U.S. Application Data

(63) Continuation of application No. 14/126,880, filed as application No. PCT/US2013/048754 on Jun. 28, 2013, now Pat. No. 9,672,374.

(30) Foreign Application Priority Data

Oct. 19, 2012 (IN) .......................... 1213/KOL/2012

(51) Int. Cl.
*G06F 21/62* (2013.01)
*H04L 29/08* (2006.01)
*G06F 21/44* (2013.01)
*G06F 21/55* (2013.01)
*G06F 21/56* (2013.01)
*G06F 21/78* (2013.01)

(52) U.S. Cl.
CPC .......... *G06F 21/6218* (2013.01); *G06F 21/44* (2013.01); *G06F 21/552* (2013.01); *G06F 21/554* (2013.01); *G06F 21/566* (2013.01); *G06F 21/78* (2013.01); *H04L 67/10* (2013.01)

(58) Field of Classification Search
CPC ..... G06F 21/6218; G06F 21/78; G06F 21/554
See application file for complete search history.

(56) References Cited

U.S. PATENT DOCUMENTS

| 5,987,610 | A | 11/1999 | Franczek et al. |
| 6,073,142 | A | 6/2000 | Geiger et al. |
| 6,304,946 | B1 * | 10/2001 | Mason, Jr. .......... G06F 12/0804 707/999.002 |
| 6,460,050 | B1 | 10/2002 | Pace et al. |
| 6,971,018 | B1 * | 11/2005 | Witt ....................... G06F 21/52 705/57 |

(Continued)

FOREIGN PATENT DOCUMENTS

KR   20100078081 A   7/2010

OTHER PUBLICATIONS

Chinese Patent Office First Office Action in Chinese Patent Application No. 20130048900.7 dated Sep. 19, 2016.

(Continued)

*Primary Examiner* — Dao Q Ho
(74) *Attorney, Agent, or Firm* — Patent Capital Group

(57) ABSTRACT

A request is received from a security tool, the request relating to an event involving data records in a storage device. An application programming interface (API) is used to interface with secure storage functionality of the storage device, the secure storage functionality enabling a set of secure storage operations. A security operation is caused to be performed at the storage device involving the data records based at least in part on the request. In one aspect, the set of secure storage operations can include a direct read operation, a direct write operation, a copy-on-write operation, and a save-attempted-write operation.

18 Claims, 14 Drawing Sheets

(56) References Cited

U.S. PATENT DOCUMENTS

| | | |
|---|---|---|
| 7,506,155 B1 | 3/2009 | Stewart et al. |
| 7,814,554 B1 | 10/2010 | Ragner |
| 9,672,374 B2 | 6/2017 | Kabra et al. |
| 2003/0079138 A1* | 4/2003 | Nguyen .............. G06F 21/575 713/193 |
| 2006/0117136 A1 | 6/2006 | Tran et al. |
| 2007/0061581 A1 | 3/2007 | Holtzman et al. |
| 2010/0061552 A1 | 3/2010 | Becker et al. |
| 2010/0146267 A1 | 6/2010 | Konetski et al. |
| 2011/0219425 A1 | 9/2011 | Xiong et al. |
| 2012/0072989 A1 | 3/2012 | Sakai et al. |
| 2012/0255004 A1 | 10/2012 | Sallam |
| 2013/0304705 A1 | 11/2013 | Wong |
| 2014/0318000 A1 | 10/2014 | Goetheer et al. |

OTHER PUBLICATIONS

PCT International Search Report and Written Opinion received for PCT Patent Application No. PCT/US2013/048754, dated Oct. 18, 2013.

Chinese Patent Office Second Office Action in Chinese Patent Application No. 20130048900.7dated Mar. 31, 2017.

Extended European Search Report in EP Patent Application Serial No. 13847351.7 dated Aug. 31, 2016, 11 pages.

Final Office Action in U.S. Appl. No. 14/126,880 dated Jul. 14, 2015, 10 pages.

Final Office Action in U.S. Appl. No. 14/126,880 dated Jun. 20, 2016, 11 pages.

Non Final Office Action in U.S. Appl. No. 14/126,880 dated Dec. 21, 2015, 10 pages.

Non Final Office Action in U.S. Appl. No. 14/126,880 dated Jan. 30, 2015, 8 pages.

Notice of Allowance in U.S. Appl. No. 14/126,880 dated Jan. 17, 2017, 16 pages.

Partial Supplementary European Search Report in EP Patent Application Serial No. 13847351.7 dated May 27, 2016.

PCT International Preliminary Report on Patentability in PCT International Application Serial No. PCT/US2013/048754 dated Apr. 21, 2015.

Chinese Patent Office Notice of Grant in Chinese Patent Application No. 201380048900.7 dated Aug. 23, 2017, 4 pages including translation.

Notice of Allowance in U.S. Appl. No. 14/126,880 dated Jan. 17, 2016, 17 pages.

* cited by examiner

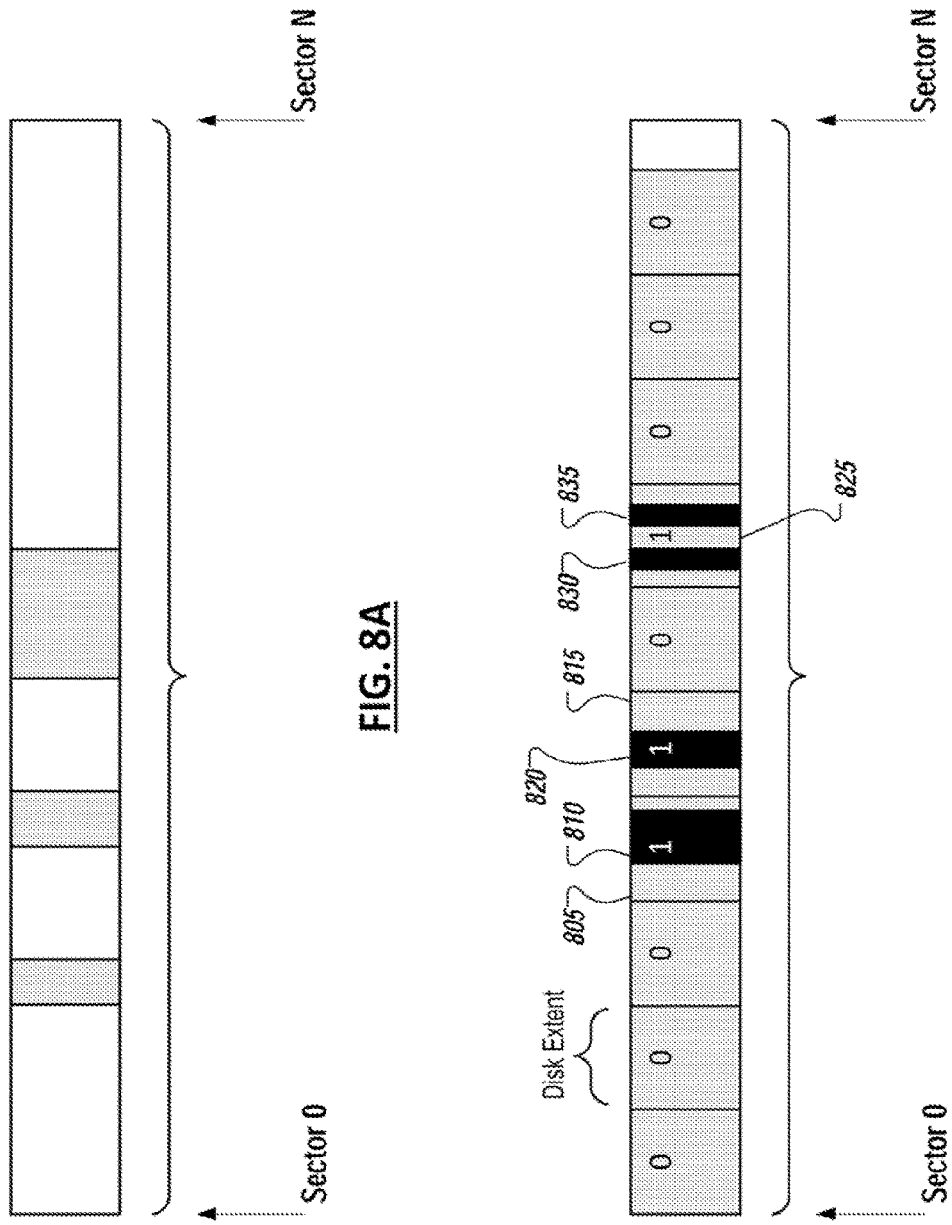

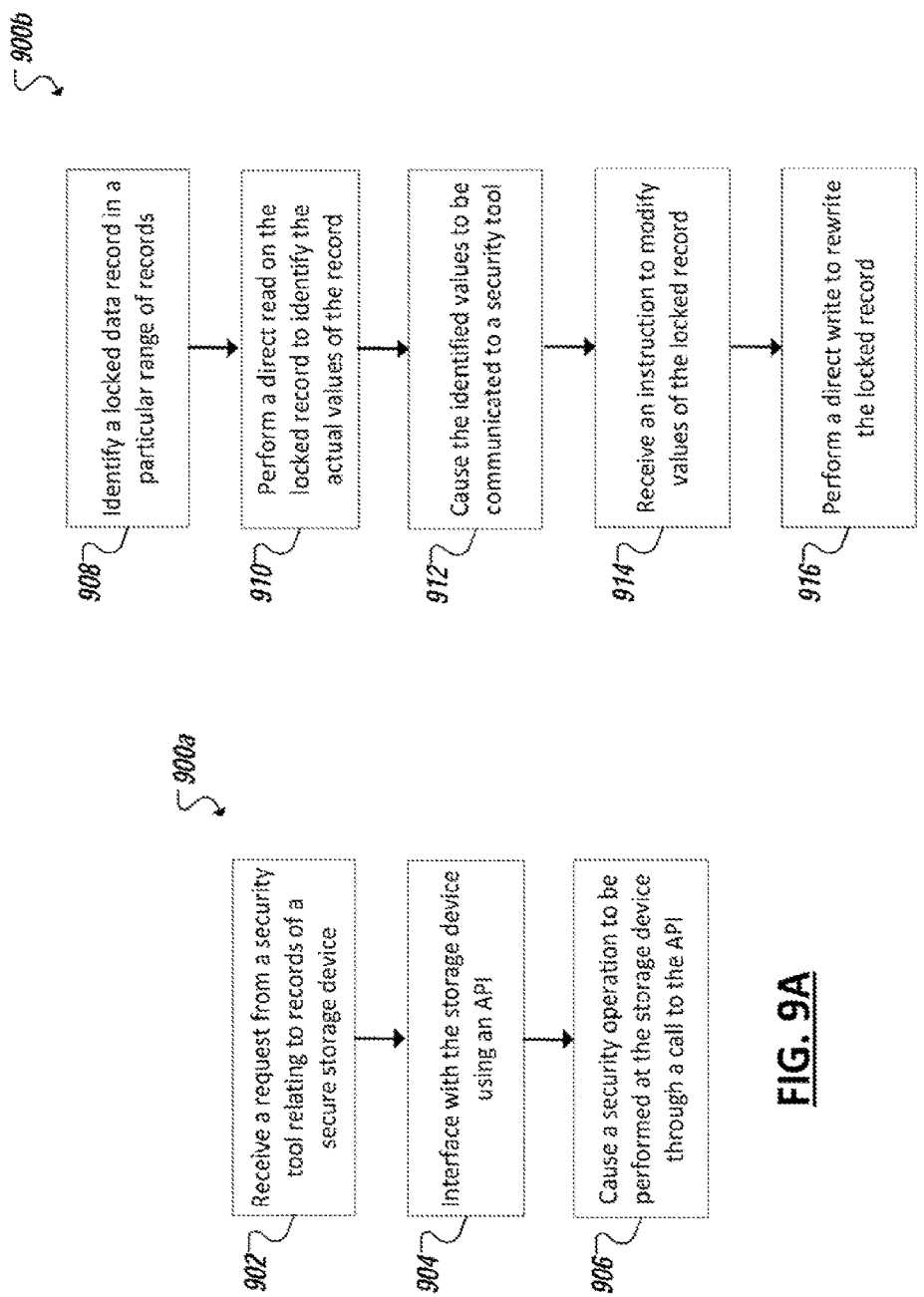

SECURE DISK ACCESS CONTROL

CROSS-REFERENCE TO RELATED APPLICATIONS

This Application is a continuation (and claims the benefit of priority under 35 U.S.C. § 120) of U.S. application Ser. No. 14/126,880 filed Dec. 17, 2013 and entitled SECURE DISK ACCESS CONTROL and now U.S. Pat. No. 9,672,374, which is a national stage application under 35 U.S.C. § 371 of PCT International Application Serial No. PCT/US2013/048754, filed on Jun. 28, 2013 and entitled SECURE DISK ACCESS CONTROL, which application claims the benefit of priority to Indian Provisional Patent Application Serial No. 1213/KOL/2012 filed on Oct. 19, 2012 and entitled SECURE DISK ACCESS CONTROL. The disclosures of the prior applications are considered part of and are hereby incorporated by reference in their entirety in the disclosure of this application.

TECHNICAL FIELD

This disclosure relates in general to the field of computer security and, more particularly, to malware detection and remediation.

BACKGROUND

Storage is precious resource on computing systems. Storage devices of computing systems can be repositories not only for application files and data but also critical operating system files, and critical high-value data, including sensitive personal data, among other examples. Root kits, viruses, and other malware attacks have been known to target storage devices such as the boot loader (e.g. a master boot record (MBR)), file systems, disk regions, etc. of a storage device. Examples of such malicious programs include TDL4, Trojan.Mebroot, Popureb.E, Max++, among others. Such malicious programs can manipulate system storage to create room for their persistence, create private file systems or storage partitions, commit data theft, data leak, and data loss, among other examples.

BRIEF DESCRIPTION OF THE DRAWINGS

FIGS. 8A-8B are simplified representations of data records in an example secure-storage-enabled storage device;

FIGS. 9A-9E are flowcharts representing example techniques involving an example disk access security agent;

Like reference numbers and designations in the various drawings indicate like elements.

DETAILED DESCRIPTION

Figure 1:
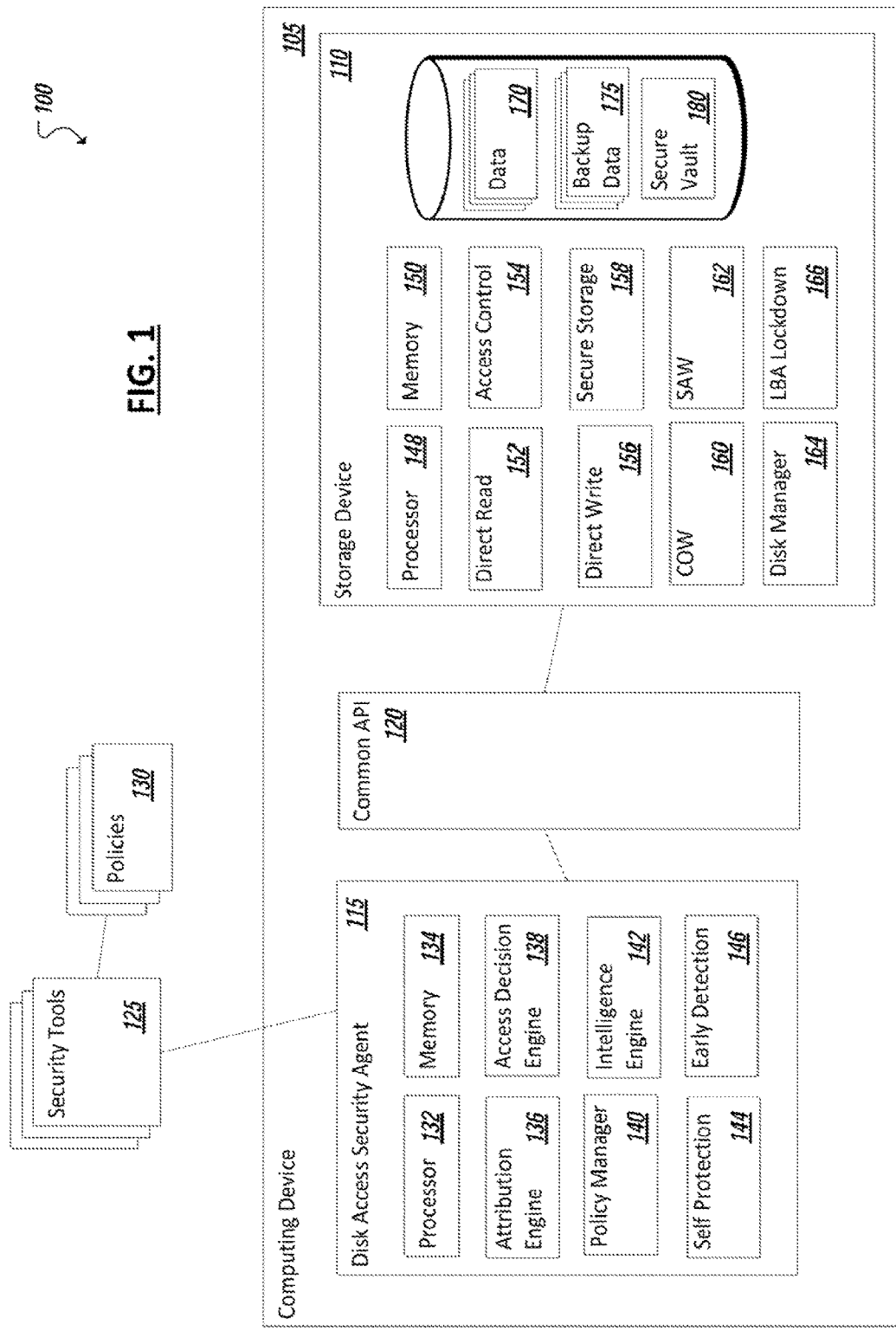
FIG. 1 is a simplified schematic diagram of an example system including an example disk access security agent.

FIG. 1 illustrates an example system 100 including, for instance, an example computing device 105 having a disk access security agent 115 capable of interfacing with and controlling one or more storage devices (e.g., 110) utilized by the computing device 105. A disk access security agent 115, in some implementations, can control operations and logic available at the storage device level (e.g., 11)) to provide specialized secure storage functionality extending to the lowest layer of a system software stack. The disk access security agent 115 can interface with functionality provided on the secure-storage-enabled storage devices (e.g., 110) through one or more APIs (e.g., 120). In one example, a disk access security agent 115 can be configured to potentially interface with multiple secure-storage-enabled storage devices through a single, common API 120, among other potential examples.

In some implementations, disk access security agent 115 can further interface with and connect to security management tools (e.g., 125), including suites of security tools, providing high-level security assessment and policy management services. Such security tools (e.g., 125) can include, for instance, host intrusion prevention systems, anti-malware detection and remediation tools, data access controls and protection, among other examples. Further, a variety of security policies (e.g., 130) can be defined and managed through outside (e.g., remote and/or third-party) security management tools (as well as security tools present on the computing device 105) to guide the disk access security agent's 115 interactions and control of various storage- or disk-level operations at secure-storage-enabled storage devices (e.g., 110).

In one example implementation, a disk access security agent 115 can include one or more processors 132 and one or more memory elements 134 as well as one or more components providing various functionality, for instance, in connection with the disk access security agent's interaction with storage devices (e.g., 110). In some examples, such components can include an attribution engine 136, access decision engine 138, policy manager 140, intelligence engine 142, self-protection engine 144, early or off-line detection engines 146, among potentially many other examples. In one example implementation, an attribution engine 136 can possess functionality and logic for identifying, from information detected through monitored read/write attempts at a storage device 110, the source of a particular read/write attempt, among other examples. A disk access security agent 115, in some instances, can further include an access decision engine 138 possessing logic and functionality for determining actions to be taken, for instance, at the storage device 110, in response to various read/write attempts at the storage device (e.g., based on identification of the source of a particular read/write attempt using attribution engine 136). Again, information can be collected at the storage device 110 or higher up the software stack describing monitored read/write attempts, this information can be provided to the disk access security agent 115 and utilized, for instance, by an example access decision engine 138 to determine whether the read/write attempt is a legitimate, desired, or trustworthy one, or, in some instances, an unknown or untrustworthy read/write attempt that should be blocked, further analyzed, or otherwise remediated.

A disk access security agent 115 can, in some examples, further include additional components such as a policy manager 140. An example policy manager 140 can include functionality for receiving, updating, and applying policies, such as policies 130 served to the disk access security agent 115 via one or more security management tools 125, to read/write attempts of the disk (e.g., storage device 110) with which the disk access security agent 115 interfaces (e.g., through a common API 120). Relatedly, an intelligence engine 142 can be provided in some implementations of the disk access security agent 115 to gather intelligence from one or more security tools 125 discovering information relating to attributes of the computing device 105, installed applications, hardware configurations, network configurations, known threats and vulnerabilities, among other examples. Intelligence collected through an example intelligence engine and/or through an example policy manager (e.g., based on intelligence gleaned from monitoring of other, similar computing devices, operating systems, applications, etc.) can be used to inform decisions, instructions, and controls of the disk access security agent 115 (e.g., using access decision engine 138) relating to activities of the storage device 110 (or "disk"). Additional components can include, for example, a self-protection module 144, for use in utilizing functions of a storage device 110 to protect files and data utilized by the disk access security agent and/or other security related tools and applications used by the computing device, among other examples.

In some implementations, a storage device 110 can be configured with logic for performing basic storage management and data read/write operations. Further, secure-storage-enabled storage devices (e.g., 110) can be further configured with functionality to perform functions, in some cases, in conjunction with a disk access security agent 115, to realize various secure storage tasks. A storage device 110 can include (or be utilized with) one or more processor devices 148, one or more memory elements 150, as well as one or more components providing functionality for performing various secure storage functionality. Storage device 110 can be a repository for various data 170 and backup data 175. In some examples, storage device 110 can store sensitive data including operating system files, local security tool files, the master boot record (MBR), volume boot record (VBR), among other examples.

A secure-storage-enabled storage device (e.g., 110) can include logic that can enable robust, storage-device operations and checks, such as, for example, logic 152 enabling direct or trusted read capabilities allowing the storage device to bypass the disk stack file system and read directly from the data records on the storage device. Similarly, an example storage device can possess logic 156 for performing direct trusted writes on its data. In some implementations, a storage device can possess logic 154 for performing basic data access control operations, such as blocking or disallowing, as well as modifying read, write, and other access attempts of the storage device data, such as particular regions of the storage device. Indeed, a storage device can possess functionality for defining and initializing portions of the disk for secure storage (e.g., secure storage logic 158), and can further possess functionality for managing the disk (e.g., disk management logic 164). Relatedly, an example storage device can possess logic for defining and reserving sections of memory as an encrypted secure vault 180 section.

Further, in some examples, storage device can be configured with logic 160 for performing a copy on write operation to automatically produce a backup copy of one or more data records in response to an attempt to overwrite the one or more data records. An example storage device can be further configured with logic 162 to produce other backup copies, for instance, copying a particular write attempt and saving the write attempt to backup memory, in lieu of allowing the write attempt to overwrite the actual targeted data records (e.g., a save attempted write (SAW) operation). Further, storage device can be provided with logic 166 for locking particular records, for instance, through an LBA lock, etc. Additional features and functionality of a secure-storage-enabled storage device (e.g., 110) can include logic for performing false data reads, logic for blocking certain write or read attempts, logic for returning a false write success, among other examples.

In general, "servers," "clients," "client devices," "computing devices," "network elements," "hosts," "system-type system entities," "storage devices," and "systems," including system devices in example computing environment 100, can include electronic computing devices operable to receive, transmit, process, store, or manage data and information associated with the computing environment 100. As used in this document, the term "computer," "processor," "processor device," or "processing device" is intended to encompass any suitable processing device. For example, elements shown as single devices within the computing environment 100 may be implemented using a plurality of computing devices and processors, such as server pools including multiple server computers. Further, any, all, or some of the computing devices may be adapted to execute any operating system, including Linux, UNIX, Microsoft Windows, Apple OS, Apple iOS, Google Android, Windows Server, etc., as well as virtual machines adapted to virtualize execution of a particular operating system, including customized and proprietary operating systems.

Further, servers, client devices, network elements, systems, and computing devices can each include one or more processors, computer-readable memory, and one or more interfaces, among other features and hardware. Servers can include any suitable software component or module, or computing device(s) capable of hosting and/or serving software applications and services, including distributed, enterprise, or cloud-based software applications, data, and services. For instance, in some implementations, security management tools can be implemented on cloud-implemented computing systems configured to remotely host, serve, or otherwise manage data, software services and applications interfacing, coordinating with, dependent on, or used by other services and devices in system 100. In some instances, a server, system, subsystem, or computing device can be implemented as some combination of devices that can be hosted on a common computing system, server, server pool, or cloud computing environment and share computing resources, including shared memory, processors, and interfaces.

Computing devices can include traditional and mobile computing devices, including personal computers, laptop computers, tablet computers, smartphones, personal digital assistants, feature phones, handheld video game consoles, desktop computers, internet-enabled televisions, and other devices designed to interface with human users and capable of communicating with other devices over one or more networks. Computer-assisted, or "smart," appliances can include household and industrial devices and machines that include computer processors and are controlled, monitored, assisted, supplemented, or otherwise enhance the functionality of the devices by the computer processor, other hardware, and/or one or more software programs executed by the computer processor. Computer-assisted appliances can include a wide-variety of computer-assisted machines and products including refrigerators, washing machines, automobiles, HVAC systems, industrial machinery, ovens, security systems, and so on.

Some computing devices can further include at least one graphical display device and user interfaces, supported by computer processors of the system devices, that allow a user to view and interact with graphical user interfaces of applications and other programs provided in system 100, including user interfaces and graphical representations of programs interacting with applications hosted within the system devices as well as graphical user interfaces associated with application management server services and other applications, etc. Moreover, while system devices may be described in terms of being used by one user, this disclosure contemplates that many users may use one computer or that one user may use multiple computers.

While FIG. 1 is described as containing or being associated with a plurality of elements, not all elements illustrated within computing environment 100 of FIG. 1 may be utilized in each alternative implementation of the present disclosure. Additionally, one or more of the elements described in connection with the examples of FIG. 1 may be located external to computing environment 100, while in other instances, certain elements may be included within or as a portion of one or more of the other described elements, as well as other elements not described in the illustrated implementation. Further, certain elements illustrated in FIG. 1 may be combined with other components, as well as used for alternative or additional purposes in addition to those purposes described herein.

Figure 2:
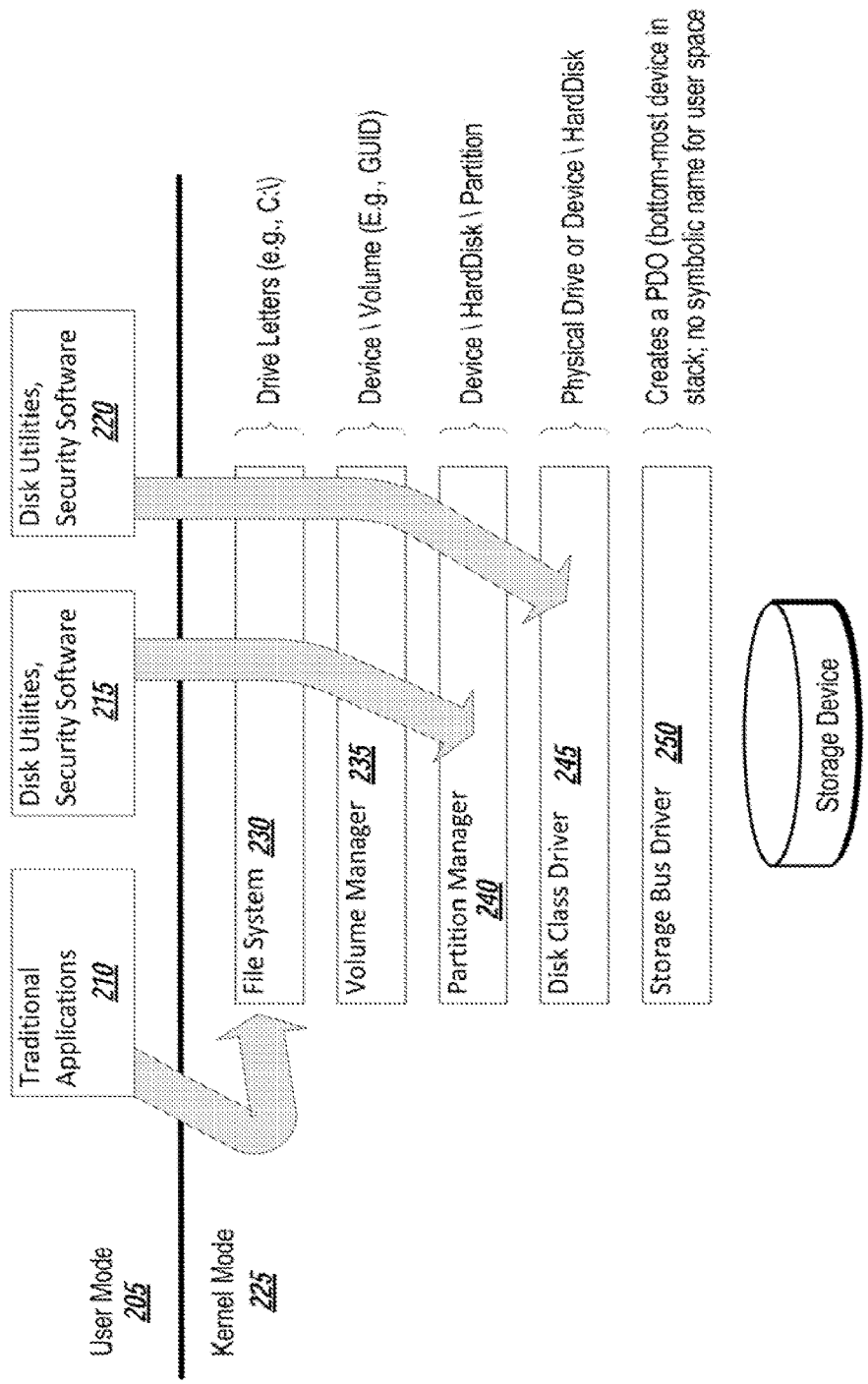
FIG. 2 is a simplified block diagram of an example system including an example storage device.

Turning now to the simplified block diagram of FIG. 2, example subsystems of a computing device are illustrated including elements responsible for managing various storage capabilities of the device. In a user mode 205 of the device, traditional applications 210, disk utilities, security software, etc. (215, 220) can be provided. The kernel mode 225 of the device can include file system 230, volume manager 235, partition manager 240, disk class driver 245, and storage bus driver 250. Modern malware has been known to exploit each level (e.g., 230, 235, 240, 245, 250) of the kernel mode 225 including the storage bus driver 250 and other elements sitting at the bottom-most layer of the stack. Unfortunately, traditional disk access controls and security tools do not protect at the storage bus driver level. Implementations applying principles of the example system 100 described above can address several of the shortcomings and issues of traditional disk access control systems.

Figure 3:
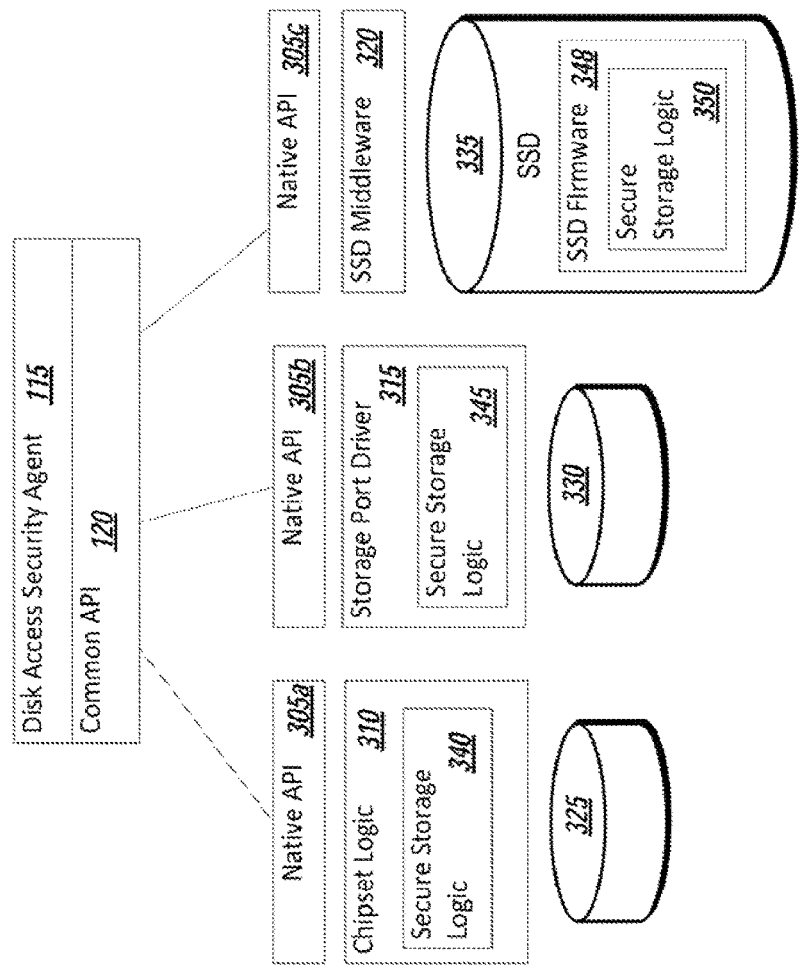
FIG. 3 is a simplified block diagram representing aspects of an example system including an example disk access security agent and common API.

Turning now to the example of FIG. 3, a simplified block diagram is shown of a disk access security agent 115 interfacing with various storage devices (e.g., 325, 330, 335) at various levels of the software stack including chipset-based storage devices (e.g., 325), host-based storage devices (e.g., 330), as well as solid state drive (SSD) devices (e.g., 335) using a common API 120. Disk access security agent 115 can be utilized in connection with secure storage functionalities available at secure-storage-enabled storage devices (e.g., 325, 330, 335), including at the storage port (or storage bus) driver level. For instance, host-based secure storage can be provided at the lowest level of the software stack, such as in an RST driver or controller driver. Host-based secure storage can function potentially across multiple hard disks and storage devices. Secure storage can additionally or alternatively be implemented at the chipset level, for instance, at the device communication bus level. In still another example, such secure storage functionality can additionally or alternatively be implemented at the disk level, such as in firmware of a computing device's solid-state drive (SSD), among other examples. In the example of FIG. 3, a common API 120 can be defined allowing for disk access security agent 115 to control storage security at any one of the host-based, chipset-based, and/or firmware based levels. Such an API 120 can abstract the interface to each of these three technologies and provide a common set of functionality that can be utilized at the direction, for example, of the disk access security agent 115 communicating with these storage security technologies over the common API.

A unified secure storage API, or common API 120, can encompass the functionality of host-, firmware- and chipset-based implementations of a secure storage solution. Such an API 120 can additionally be used to obtain a listing of which secure-storage-enabled storage devices are available on a system as well as query each device's secure storage capabilities (e.g., whether the device includes host- firmware- and/or chipset-based implementations of a secure storage solution). The API can further allow a disk access security agent 115, for instance, to create, apply, and manage separate policies for each individual device, such as policies used by higher-level and user mode security tools.

In one example, native APIs 305a, 305b, 305c providing interfaces to the particular secure storage functionality of a particular secure-storage-enabled storage device. For instance, in the example of FIG. 3, each of a chipset-based secure storage device 325, host-based secure storage device 330, and secure SSD 335 can have a corresponding native API (305a, 305b, 305c respectively). Common API 120 can act as a translator of commands and instructions received through or by disk access security agent 115 into instructions compatible with a respective, corresponding native API (e.g., 305a-c) of the target secure storage device (e.g., 325, 330, 335). In some implementations, disk access security agent 115 can include logic for accessing and communicating through native APIs 305a-c directly. Alternative implementations of a disk access security agent 115 can forego use of a common API 120, in some examples, among other potential implementations. Hardware and/or software-implemented logic can manage access to particular secure storage devices and native APIs 305a-c can provide interfaces to such logic. For instance, chipset logic 310 can provide secure storage functionality implemented at the chipset level for one or more storage devices (e.g., 325), storage port driver 325 can be used to provide secure storage functionality implemented at the host level for one or more storage devices (e.g., 330), and SSD firmware 348 (or alternatively middleware 320) can manage SW 335. Further, respective secure storage logic 340, 345, 350 can be provided to facilitate the particular secure storage functionality with which the respective secure storage device is to be enabled, such as logic for implementing read and write blocks, false data reads, false write successes, COW, SAW, direct read, direct write, and so on.

In some example implementations, a native, or kernel mode, API can be provided in a statically linked library maintained, for instance, by one or more hardware and/or security providers. User mode APIs may be omitted in some instance. The library, in some instances, can be statically linked to a system's lower-class filter driver, among other examples. Further, API function definitions can evolve over time as new secure storage capabilities are developed and native APIs and the common API can be extended to support such additional capabilities.

Example implementations of a common API can provide multiple, simultaneous device support in that the common, unified API supports management of each storage device available on the system that includes functionality compatible with the API. A disk access security agent can communicate with each storage device individually through the same common API. Additionally, in some implementations, multiple secure storage technologies can be applied simultaneously on a single storage device (e.g., through host-based secure storage support over a firmware based secure storage drive, etc.). In such instances, the disk access security agent may have access to the combined superset of the capabilities present on a given storage device. Some implementations of the disk access security agent can be configured to query and configure combined feature sets in some implementations, rather than defining the combined feature sets in the common API, as in some alternate implementations. Such management can include, for instance, protecting against conflicts between potentially multiple secure vaults present on the same device (e.g., one secure vault for the host-based solution, one for the firmware based solution and one for the chipset-based solution, etc.).

In some implementations, a common API may use a handle (or other identifier) to identify a target storage device and the respective secure storage technology to which the API call applies. This can allow for the configuration of specific devices and, in the case of callbacks, identification of the source device. Installation and provisioning tasks can additionally be provided, through one or more APIs, including in some examples a user mode library. For instance, the installer module, for example, on a disk access security agent controlling storage devices of a system, can carry out various installation and provisioning tasks, such as those described herein. For example, a list of secure-storage-enabled storage devices can be queried to discover such devices. Further, in some implementations, a capability query can be performed to identify a list of secure storage capabilities for each device (and hardening level) on the system so as to install appropriate point product features. Further, in addition to the capabilities return, for instance, from a native or kernel API query, additional attributes of a storage device can be identified, such as whether the storage device has already been provisioned. Further, an example installer module can be capable of upgrading, for instance, a disk access security agent and/or class filter driver used in the implementation of the disk access security agent if an installation package contains a newer version than what is currently installed, among other examples. Accordingly, packaging disk access security agent with point products and providing disk access security agent upgrade capabilities can provide convenience and save users from the additional step of manually updating the disk access security agent, among other examples. In some implementations, the installer module can be capable of running silently, with no user interface, using input values specified on the command line and hardcoded defaults, among other examples.

Provisioning can be tightly integrated with installation and relate to the process of allocating reserved space on a storage device disk for a secure vault, among other examples. Additionally, provisioning can include obtaining of encryption/authentication keys to be used in communications, for instance, between the storage device and an agent or other programs. An example installer can initiate creation of a secure vault on every device utilizing secure storage capabilities as well as at each secure storage implementation (or hardening level) being utilized on the device. This can serve to create storage for logs, backup data (e.g., for copy-on-write's and save attempting write's), encryption keys, sensitive user/application data, whitelists, blacklists, data loss prevention (DLP) data, DAT file storage, etc., as well as secure storage for metadata generated and used by the storage device. Optionally, the installer may specify space for application-defined storage.

Secure vault creation can include preparing the disk (i.e., secure-storage-enabled storage device), either through repartitioning or shrinking the reported disk capacity. Initialization tasks can be performed on the secure vault, such as segmenting it for multiple uses (logging, backups, application data) and potentially installing a file system. Provisioning can further include provisioning of authentication credentials. Provisioning can be possible in an environment without an Internet connection, in some implementations, such as where a provisioning server is available on the local intranet, among other examples.

Authentication credentials can be provisioned. Credentials can be provisioned differently for various secure storage technologies. For instance, in one implementation, firmware based secure storage can rely on SIGMA protocol or other encryption techniques while host-based secure storage utilizes host-based encryption schemes services. The deprovisioning can also be performed, for instance, by the installer module, including the complete wiping of a designated secure vault storage before returning the disk space to the system. In some implementations, if a new secure storage compatible storage device is added after the initial installation and provisioning, a mechanism can be provided for provisioning the new storage device, for instance, through a user mode service process that communicates with disk access security agent, among other example implementations. The disk access security agent can then discover the newly provisioned storage device during the disk access security agent's normal initialization process.

A secure vault can be regarded as a multipurpose storage area that can be subdivided, for instance with various sections, such as sections for log storage, backup storage (for the "copy on write" and "save attempted write" actions), application defined storage (e.g., as managed by the agent), storage device metadata, among other implementations. In some examples, storage device metadata can be hidden from visibility of the disk access security agent. The size of the secure vault can be specified at provisioning time. If the particular secure storage implementation utilizes additional reserved space for storage device metadata then that can be handled implicitly by the secure vault provisioning API. Further, communication to and from a secure vault can be encrypted so as to block visibility of the data to external actors. Similarly, data at rest in the secure vault can be either encrypted or otherwise hidden to external actors outside of an authenticated secure channel. In some implementations, encryption keys utilized to encrypt the secure vault can be managed and changed periodically, or in response to determining that the secure vault and/or its encryption has somehow been compromised. This can, in some implementations, result in the decryption and re-encryption of the secure vault data. The disk access security agent can possess functionality for specifying the size limits of secure vault subdivisions (log, backup and application-defined storage) as well as other configurations at creation time. In some instances, size limit specified for a secure vault may be static while in other implementations dynamic resizing of the secure vault can be facilitated, for instance, to allow for expansion of the secure vault without deprovisioning/reprovisioning and potential loss of secure vault data (including backups and log entries) and policies. Further, in some implementations, the reserved space of the secure vault can be represented to users, such as by reducing the reported capacity of the drive so that the secure vault is completely invisible, displaying the secure vault space as a separate partition, or displaying the secure vault as a file within the file system, among other examples.

Additional steps can be performed by a disk access security agent in connection with initialization of storage devices employing secure storage capabilities. For instance, as part of the disk stack, the disk access security agent can be monitoring the initialization of storage devices without the use of the common API. A capabilities query can additionally return information such as a version number corresponding to the secure storage implementation of a detected storage device. The current secure storage device configuration can be queried, for instance, to examine the persistent settings at start up time. Additionally, the disk access security agent can query a storage device's power cycle counter, for instance, to determine if the drive has been used, for instance, while the disk access security agent was unavailable or disconnected. In some instances, the disk access security agent can perform an integrity check to ensure the system is clean and that any persistent policy settings are still valid. Further, in some examples, the disk access security agent can be used to detect whether there has been any unexpected communication with a particular storage device since the disk access security agent was last running, including policy changes affecting the common API, direct read operations, direct write operations, secure vault accesses, among other examples. Further, two-way, mutual authentication can be supported between the disk access security agent and a supported secure storage device.

Figure 4:
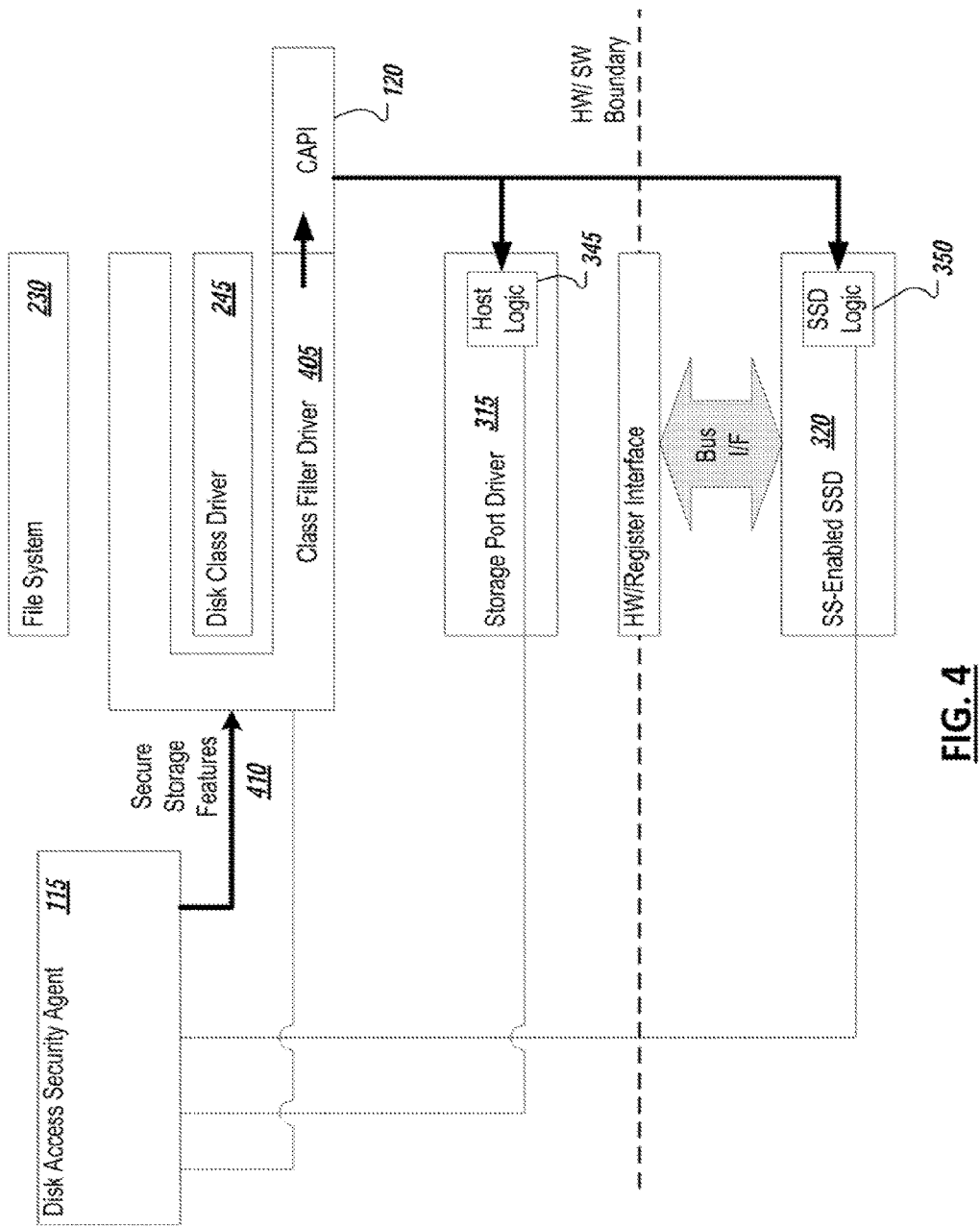
FIG. 4 is a simplified block diagram representing interactions between an example disk access security agent and example secure-storage-enabled storage devices.

Turning now to the example of FIG. 4, a simplified block diagram is shown illustrating one particular example implementation of a system including secure storage capabilities. As shown in the example of FIG. 4, a disk access security agent 115 can interface with any one of a variety of implementations of secure-storage-enabled storage devices. In one example, secure storage features 410 of disk access security agent 115 can be supported or at least partially implemented through a class filter driver 405 corresponding to the disk access security agent 115. Class filter driver 405 can be statically linked with common API 120 to pass commands from disk access security agent 115 to host-based secure storage logic 345, SSD-based secure storage logic 350, etc. Synchronous operation can be supported, for example, operations can complete before the API returns and the return status can indicate success or failure of the operation. Callbacks to asynchronous event notifications can be provided and disk locations, in some implementations, can be expressed in logical block addressing (LBA), with file to LBA mapping completed, for instance, utilizing Windows (or other) API calls, among other example implementations.

A variety of services can be provided in connection with secure storage enabled storage devices and disk access security agents. For instance, deep and trusted disk monitoring can be carried out, as well as data access protection. In some implementations, self-protection and early detection functions can be supported, as well as disk-level remediation, provision of secure storage space, among other features. For instance, a set of features can be enabled for hardened system protection, detection, and remediation. Storage block and file lockdown can be realized, for instance, by failing write attempts to locked disk blocks (e.g., MBR, recover OS protection, etc.). In another example, storage block and file level monitoring can be facilitated with write attempts to "watched" disk blocks and files reported (synchronously) to a cooperating disk access security agent.

Advanced disk monitoring functionality can also be enabled based on a secure storage device and disk access security agent implementation. For example, disk regions can be defined as "protected" and subject to monitoring and access control according to one or more corresponding policies. Monitoring can include the monitoring of various type of data access attempts, include read attempt, write attempts, TRIM (SSD) attempts, etc. Further, monitoring at the lowest level of the software stack through a secure storage enabled storage device can allow intelligence to be gathered and called-back to the disk access security agent allowing for additional functionality and features, such as attribution, blacklisting and whitelisting (based on attribution results and historical trends of various actors), runtime decision-making (e.g., regarding access to data on the storage device), etc. Further, a disk access security agent can issue commands to the storage device, for instance, over a common API triggering the performance of various operations (e.g., in accordance with the enforcement of one or more relevant policies identified by the agent) such as copy on write operations, save attempt read operations, false data read operation, logging (e.g., to supplement intelligence capable of being analyzed, at least in part, using the agent), among other examples.

Systems and storage devices utilizing principles described above can exhibit still additional functionality. For instance, a secure storage device and disk access security agent implementation can provide "always on" protection. For example, when the disk access security agent is active, or interfacing with other security management services, dynamic and online security policies, real-time decision-making, and real-time notification services can be facilitated through the disk access security agent based upon information identified and conveyed by the secure storage device monitoring read/write operations at the storage port driver level, or lowest layer of the software stack. When the disk access security agent (or storage device) is off-line, protection can still be provided, for instance, through off-line policies allowing protection early in the boot cycle of the device via prevention, detection, and remediation operations capable of being performed by the storage device directly at the boot loader level (e.g., to protect against bootkit attacks, etc.). Off-line protection can even extend, in some examples, when a storage device is moved to another machine (e.g., in firmware-based secure storage implementations), among other examples.

A storage device can enjoy a true view of its disk contents. As noted above, direct read and direct write operations can be completed by the storage device, for instance, at the direction of a disk access security agent interfacing with the storage device via a defined API. Direct read and direct write operations can be useful, for example, because they cannot be blocked or altered or otherwise interfered with by other programs, including malware, in the disk stack. Such operations can be useful, for instance, in connection with such tasks as remediation, integrity checking (e.g., hash calculations), high/low comparisons of file data, among other examples.

Figure 5B:
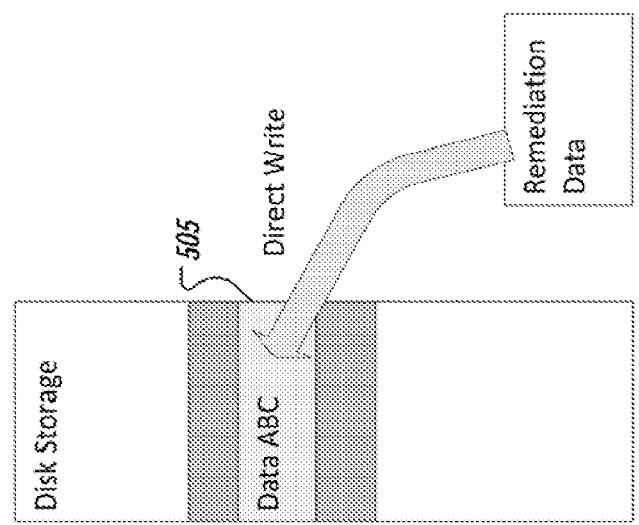
FIGS. 5A-5B are simplified block diagrams representing example secure storage operations.
Figure 5A:
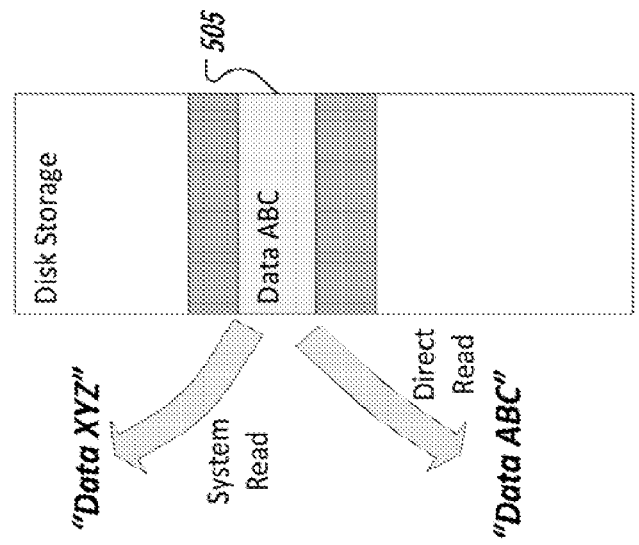

Turning to the examples of FIGS. 5A-5B, simplified representations are illustrated of example operations that can be performed using a secure storage enabled storage device, for instance, in connection with or at the direction of an example disk access security agent. For instance, in the example of FIG. 5A, a particular data record or range of data records (e.g., 505) can be identified corresponding to data or files of interest. Such protected or monitored records can be determined or specified in connection with operation and services of one or more security tools protecting such data and interfacing, for example, with an example disk access security agent. For instance, in one example, suspicious behavior may be detected (e.g., through attribution analysis) in connection with the detected range of data records. An attempt to learn more about the data records 505 can be initiated, for example, to determine whether a file within the range 505 is malware, among other examples.

In the illustrated example of FIG. 5A, a system read, such as a read of the data records 505 by a sensor or application operating at a higher level of the software, such as through the file system, may be presented with a spoofed or false representation of the contents of data records 505. The integrity of this response can be checked, for instance, utilizing direct read functionality provided to the storage device. The direct read can read the data records 505, bypassing the disk stack and influence of the file providing the false representation of data records 505 in order to obtain the true and actual contents of the range of data records 505. In this particular example, it is identified that the response to the system-level read was falsified based on a comparison of that response with the results of a direct read. The direct read may be triggered through the disk access security agent and other security management tools (interfacing with the disk access security agent) and analyzing the nature of the file (e.g., antivirus or anti-malware tools, etc.). Through the direct read, this abnormality can be detected and be considered along with other factors in determining whether the range of data records 505 houses malware or other malicious content, among other examples.

Turning to the example of FIG. 5B, direct write operability of the storage device can be triggered by a disk access security agent and employed to remediate detected problems within an identified range of data records (e.g., 505) on the disk. For instance, one or more security management tools, such as the tools detecting that data records 505 correspond with malware on the device, may request (through a disk access security agent) that the data records 505 be remediated. In some implementations, initial remediation attempts may be pursued utilizing traditional remediation technology. In some instance, if such remediation attempts are unsuccessful (or considered less desirable), direct write functionality can be employed to directly access the data record utilizing the storage device (e.g., via the direction of the disk access security agent interfacing with the storage device via the common API) and directly overwrite (e.g., using copy on write backup data) or delete the target data records 505 and remediate the issue. Further, in some implementations, a lock can be requested and applied to the identified region 505 of the disk to protect against that region being re-infected, among other examples.

As noted above, a security device, at the direction of a disk access security agent, can perform lockdowns of ranges of data records, including LBA range lockdowns For efficiency, in some implementations, a subset of ranges can be designated as monitored, important, or protected. Varying policies, monitoring techniques, and protection techniques can be further designated for the various subsets of ranges. For example, separate policies can be definable for each type of access (e.g., Write, Read and TRIM). File-to-LBA mapping can be performed by the disk access security agent. Further, each LBA range can allow metadata to be specified for the purpose of mapping event and log data back to the file system entities that are being accessed. The metadata can be defined and provided by the disk access security agent and can accompany all logging, eventing (callbacks), and backup data associated with access to the respective LBA range. The disk access security agent can associate this metadata with an LBA-to-filename mapping and possibly some additional context data, among other examples.

In some implementations, protection ranges may not be permitted to overlap. In other implementations, protection ranges are not so restricted. For instance, when multiple secure storage technology implementations are in use on the same device, the disk access security agent can be allowed to configure different policies for the same or overlapping LBA range for each implementation. For instance, one implementation may possess more desirable or effective remediation functionality, allowing for the more effective implementation to have precedents in cases where protection ranges theoretically overlap and/or interfere.

For each LBA range that is configured for monitoring, secure storage devices can be presented (e.g., by the disk access security agent) with corresponding actions to take when access to that range is attempted. In some implementations, multiple actions, including a hierarchy or series of actions, can be defined in response to particular detected events, such as identified access attempts of the protected range. For instance, if one of the proscribed actions fails (such as Copy-On-Write), this may not alter the other defined actions (such as block/allow). Failures can be logged, in some implementations, but then the other actions should proceed as normal. Further, policies can define actions that apply for the same LPA range to "online mode", when the disk access security agent has a registered callback, or "off-line mode" when the disk, access security agent is not available. Indeed, if a timeout is experienced in connection with an action, such as while waiting for asynchronous callback to complete, then the secure storage device can failover to the off-line action, in some implementations. Callbacks, such as synchronous callbacks, can be used between the storage device and the disk access security agent to coordinate the performance of actions at the storage device. For example, a callback routine in the disk access security agent can be invoked to process an event and the callback can return, in response, the actions that should be performed by the secure storage device.

A variety of actions can be returned in connection with a synchronous callback from a disk access security agent. Indeed, a combination of actions can be returned. Such actions can include, for example, for "read" events: an allow or block of the read; performance of a false data read and return of a modified view of the data; log details of the read event, among other examples. For "write" events, any combination of the following may be returned: the write can be allowed, blocked, or blocked with a returned 'fake' success; copy-on-write operation; save-attempted-write operation; logging of the write event, among other examples. For "trim" events, any combination of the following may be returned: allow or block of the trim; copy-on-write; logging of the trim event, among other examples. The original read/write event may be held in a PENDING state while the synchronous callback is processed.

Further, policies can provide for actions configured for "offline" mode when the disk access security agent is not available. For "read" events, any combination of the following can be performed: allow or block of the read; logging details of the read event, among other examples. For "write" events, any combination of the following can be provided: the write can be allowed, blocked, or blocked with a returned 'fake' success; copy-on-write operation; save-attempted-write operation; logging of the write event, among other examples. For "trim" events, any combination of the following may be returned: allow or block of the trim; copy-on-write; logging of the trim event, among other examples.

A disk access security agent can register a status callback for receiving notifications (errors or other status) from a secure storage enabled storage device. Such notifications can identify important conditions such as that backup storage or secure vault is full, among other examples. Further, in some examples, the following information can be provided to the callback routines: LBA range being accessed, LBA range metadata that was specified during configuration, type of access being requested (read/write/trim), contents being written (if applicable), SRB, IRP or similar pointer used for the disk access (to aid the agent in matching the low-level I/O to a higher level request, and ultimately the process that initiated the I/O). Further, the callback can, in some instances, modify the data being written/read.

Logging can include the logging, as well as the maintaining and accessing, of information such as an indication of the LBA range being accessed, the LBA range metadata that was specified during configuration, the type of access being requested (read/write/trim), an indication as to whether the access was allowed or blocked, the offset and length of data being read/written, a timestamp (or a mechanism that allows the agent to infer a timestamp from the storage drive's timing counters), among other potential examples. The log data can be stored in a designated section of the secure vault. Logging can include, for instance, violation reports (when particular monitored/protected LBA ranges are accessed) and status/error notices, for instance, from the storage device. Such error notices can include, for example, notices indicating that the secure vault's backup space is exhausted or that the secure storage device timed-out while waiting for the disk access security agent's callback to process an event, etc. Further, in some implementations, the log can be treated as a circular buffer. When a size limit is reached, the oldest entries of the log can be purged with new data continuously appended thereto.

Figure 6B:
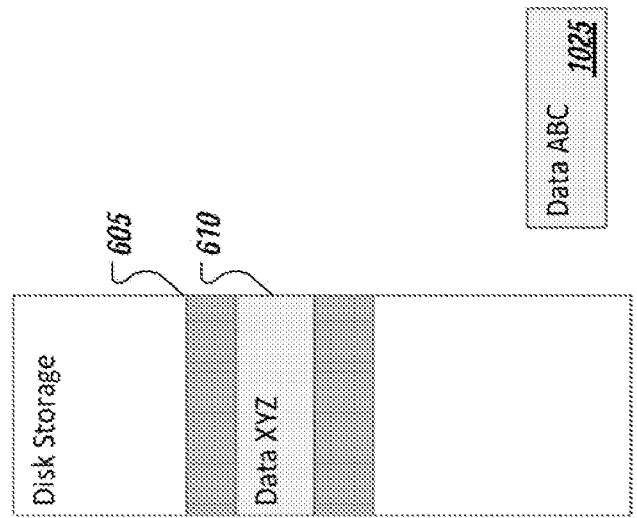
FIGS. 6A-6C are simplified block diagrams representing example secure storage operations.
Figure 6A:
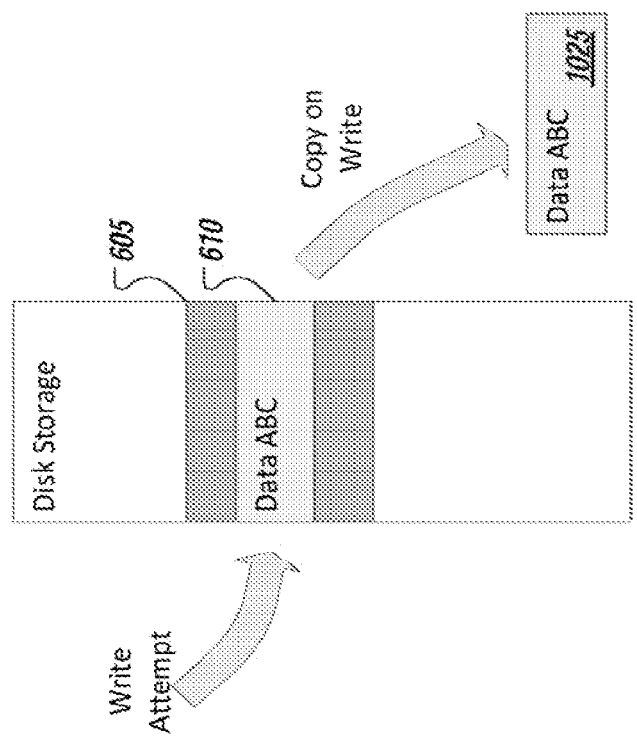
Figure 6C:
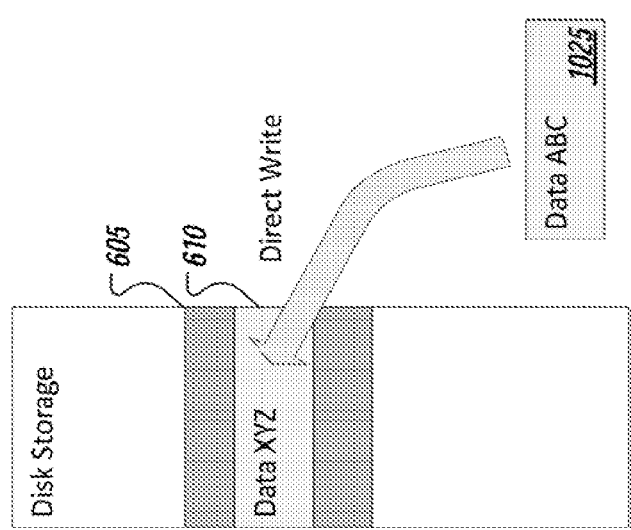

Turning to the examples of FIGS. 6A-6C, simplified block diagrams are shown illustrating an example copy-on-write (COW) operation. As noted above, portions of a disk can be designated as protected. Accordingly, in the example of FIG. 6A, a portion 605 of an example disk is represented as protected. For example, an initialization step can be performed to identify important or sensitive files and ranges within the disk storage, such as record ranges corresponding to important operating system files, the boot sector such as a master boot record (MBR), a master file table, and security application files (e.g.,. for self-protection of the agent and other security service, etc.), among other examples. Corresponding policies can be applied to various types of protected disk data record ranges. In some implementations, write attempts of records (e.g., 610) within protected disc ranges (e.g., 605) can be subject to policies that trigger an automated copy-on-write operation in response to the read attempt according to one or more applied policies. For example, modern malware may attempt to take control of an overwrite of important operating system and boot sector files. Typically, such malware may lock the overwritten or infected region of the disk, and otherwise resist removal or remediation by traditional techniques and tools.

As shown in the current example, a write attempt of protected data records 610 can trigger a backup copy of the data record 610 to be made and stored, for instance, in backup memory. In some instances, the backup copy can reside in a secure vault region of the disk. The write attempt can be allowed to proceed and rewrite the data record 610, as shown in FIG. 6B. Turning to FIG. 6C, it may be later determined that the write attempt to data record 610 should not have occurred, for instance, based on a determination, for example, by one or more security management applications or security tools interfacing with a disk access security agent, that the write attempt corresponded to some suspicious, unstable, or malicious code on the device. Accordingly, the backup copy created through the copy-on-write operation can be utilized, through a direct write to the data range 610, to restore the contents of the written-to data range 610.

Copy-on-write operations can be useful in restoring original data during remediation of malware and other undesirable code. Copy-on-write data can be maintained in a backup region of the disk, such as in the secure vault. If there is not enough space in the backup area to accommodate new copy-on-write data, other backup data can be overwritten or, in some instances, the copy-on-write operation can be skipped, among other examples. Further, in instances where a disk write attempt extends beyond the monitored LBA range, the copy-on-write operation can backup only the portion of the data corresponding to the LBA range being monitored. For example, if LBA range 100-110 is being monitored but a write attempt is made to range 95-115, then the COW backup should only reflect the data from LBA range 100-110. Further, in some implementations, backup entries can be named in a meaningful way so that the disk access security agent can communicate which entries it wants to act on. Indeed, a disk access security agent can be configured to iterate through the list of backups, retrieve the metadata for each, and read the full data for an entry, among other examples.

Figure 7A:
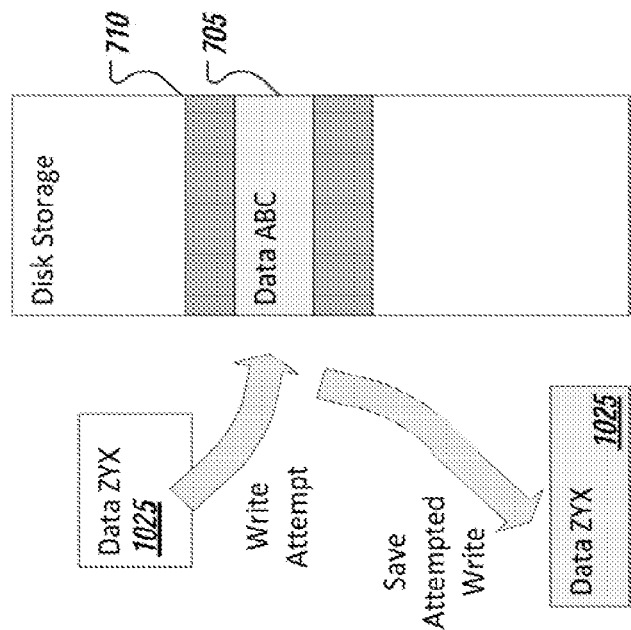
FIGS. 7A-7C are simplified block diagrams representing example secure storage operations.
Figure 7C:
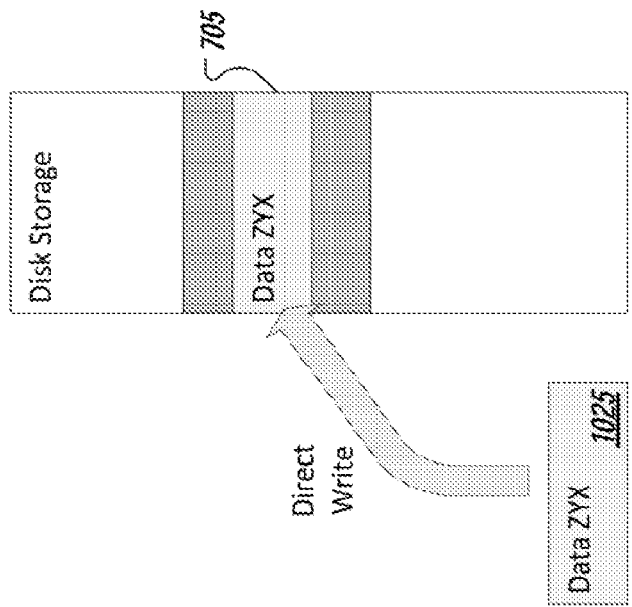
Figure 7B:
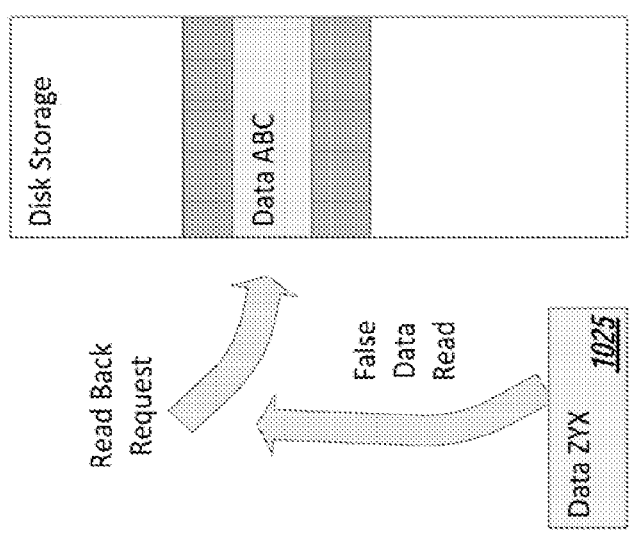

FIGS. 7A-7C illustrate an example save-attempted-write (SAW) operation and false data read involving an example secure storage enabled storage device. For example, in FIG. 7A, a write attempt is identified on a data record 705 included in a protected range of data records 710. In some implementations, the write attempt can trigger, according to one or more policies, a save-attempted-write operation. A save-attempted-write operation can be taken, for instance, when a suspected malware payload is being written to the disk. The data that was attempted to be written can be backed up, for instance, so that more extensive (asynchronous) evaluation of the data can be performed, for example, through further monitoring at the storage device. Save-attempted-write data can be stored in a designated section of the secure vault that, in some examples, includes other backup data, for instance, from the copy-on-write operations.

In the example of FIG. 7A, the save-attempted-write operation can be ordered, for instance, by the disk access security agent, based on intelligence received at the disk access security agent (e.g., from another security tool interfacing with the disk access security agent) that a detected write attempt originates from or relates to a suspected malicious, unstable, or suspicious program, among other examples. Turning to FIG. 7B, in some instances, the program responsible for the original write attempt may attempt to detect whether its actions are being monitored or blocked, for instance, by sending a read back request to verify that its write attempt was allowed and successful. It can be determined, that the detected read back request originates from this program, with the assistance of the disk access security agent and potentially other security management applications. Further, based on this determination, a false data read action can be triggered (e.g., according to one or more policies) that responds to the read back request using the save-attempted-write backup data including the contents of the original write attempt. In some instances, a whitelist or blacklist can be consulted to determine whether to provide the read back request or a full view of the data or to trigger a false data read action. A false data read action can buy the system additional time to assess the nature of the originating program making the write attempt. In some instances, despite blocking the original attempt, it can be determined that the source of the write attempt is trustworthy and that the attempt was legitimate. Accordingly, as shown in the example of FIG. 7C, the agent can request that the storage device implement the original write attempt (of FIG. 7A) by copying corresponding data from the save-attempted-write backup and writing the data to the target data record 705 (e.g., utilizing a direct write action).

As with COW actions, if there is not enough space in the secure vault's backup area for a new entry then the SAW operation can be skipped and the existing secure vault data can remain unchanged, in other implementations, the SAW action can move forward overwriting older backup data. A failure to perform a save-attempted-write action can be reported to the log. Further, in some implementations, when an attempted disk write extends beyond the monitored LBA range, the save-attempted-write may backup only the portion of the data corresponding to the LBA range being monitored.

In some implementations, the operating system can provide a numerically addressable abstraction of the storage device to the low level drivers like the storage bus driver, disk class filter driver and any filter drivers on the disk class driver. The address range can range from zero up to the size of the disk in terms of its sectors. Each sector size can be dependent on the formatting scheme of the storage device. Each sector can be addressed by its LBA or logical block address. A configuring application (e.g., utilizing a disk access security agent) can send policy data for protection of sectors of the storage device. The policy data in its simplest form can include the type of I/O operation (read/write/both), the starting address of the sector (LBA), and the number of sectors to be protected. Protection can imply that the I/O operation as chosen in the policy is denied by the disk filter driver, if the I/O is in the region of disk defined by the sectors/LBAs in the policy.

In one example, an I/O operation by any application can be defined by one or more of the type of I/O (e.g., READ/WRITE), the disk region it is aimed at (in terms of the sector on the disk), and the size. The disk filter, therefore, can keep the policy data in its system memory and check it for every I/O operation taking place on the disk. Since the disk filter's check (or look up) operation is in the two path of every application running on the system and the storage device, and the number of policies could be many and be scattered across all the LBAs on the disk, the disk filter's check operation can significantly degrade the performance of the application, the disk access security agent, and the system as whole.

To assist more efficiently looking up policies applicable to the particular disk region (or range of data records on the disk) an improved look up mechanism can be provided to allow a more targeted search of relevant policies. For instance, is illustrated in the simplified examples of FIGS. 8A-8B, storage media can be considered as a single linearly growing and numerically addressable object of a fixed number of sectors. For instance, FIG. 8A illustrates a representation of a disk of N sectors. Shaded regions can represent, for example, ranges on the disk defined by starting sector and its length. The disk filter driver can store many such ranges along with one or more policies associated with each range governing actions for I/O (or read/write) attempts on the range.

In some instances, the number of ranges stored (and the associated policies with each range) can be very high and it would be suboptimal to store them in data structures with a high or linear order of search. In one example implementation, a tree structure can be used such as a binary search tree, such as an AVL tree. Further, each policy applicable to one or more data records in a range can be, in some implementations, stored as a node record of a single global search tree for the entire disk. In other, more optimized implementations, multiple binary search trees can be provided for a single disk. Each defined range can be assigned an associated tree such that each tree has a much smaller depth (and thereby improving the overall look up time). Indeed, instead of utilizing one global tree per disk and having to traverse the tree for every I/O, the disk can be construed as a collection of sections such as a collection of many equal sized smaller disks (plus a possible unequal last disk) referred to as extents.

In one example implementation, a single AVL (or other binary) tree can be provided and assigned to each extent defined for the disk. Accordingly, each tree only stores policy information for the disk ranges corresponding to its respective extant. In some instances, a particular range may span across multiple extent boundaries, in which case a single range, in some instances, can be broken into multiple ranges and subdivided across the multiple extents such that each portion of the single range is contained within a single extent boundary. Further, each extent specific tree can include nodes identifying policies applicable to data record ranges within the corresponding extent. This can provide for much more efficient searches of the respective trees. For instance, in response to a detected read/write action involving a particular data record or range of data records, one or more corresponding extents can be identified that contain the particular data record or range of records. Further, corresponding search trees for the extents of the particular data records can be identified and searched to swiftly determine whether policies or protection designations have been defined that apply to the particular data records.

Further, in some implementations, a bit mask can be maintained that provides a shorthand mechanism for determining whether any policies have been defined for records within a given extent. For example, the bit mask can include bits storing the state of "protection ranges" in a given extent. For instance, if a corresponding extent has any number (greater than zero) of protected ranges, its bit can be marked "TRUE". However, if a given extent has no protected ranges or applied policies, its corresponding bit can be marked "FALSE". In the example of FIG. 8B, for instance, extent 805 can include a protected range 815 and its corresponding bit in the bit mask can be set to "1". Similarly, extents 815 and 825 can also include protected ranges (e.g., 820, 830, 835) and their corresponding bits can also be set to "1". Other extents (e.g., 840) that do not (yet) include protected data ranges can have their bitmask values set to "0", as shown in the example of FIG. 8B.

Through the use of the example bit mask, or other indicator, such as a flag, the identification of a particular extent for an identified range of records can first result in a lookup of the bit mask or other indicator to determine whether any protected ranges or policies exist within the extent. If it is determined that no such ranges or policies exist by virtue of the bit mask or other indicator, a search of the corresponding extent search tree can be skipped (and the I/O attempt can proceed seamlessly without extra intervention by the storage device and/or disk access security agent, in some examples). Where the bit mask indicates that one or more protected ranges or policies pertain to ranges within a given extent, the corresponding extent search tree can be identified and searched to determine whether policies or protections are applied to the particular range of records, in some cases triggering the secure storage functionality of the storage device and/or disk access security agent, among other examples.

FIGS. 9A-9E include flowcharts 900a-e illustrating example techniques Utilizing a secure storage platform based, at least in part, on principles described above. For instance, in the example of FIG. 9A, a disk access security agent can interface with both one or more security tools and one or more secure-storage-enabled storage devices. A request can be received 902 from a security tool relating to data records of one of the storage devices. The request can, for example, request a verification or inspection of data on the storage device (e.g., using a direct read), identify a security event such as an attempt to write, read, or otherwise access the storage device, and request a particular security operation or set of security operations to be performed on the storage device utilizing the secure storage functionality of the storage device, in accordance with one or more security policies, among other examples. The disk access security agent can interface 904 with the storage device using an API. In some implementations, the API can be a common API for use in interfacing with multiple different implementations of secure-storage-enabled storage devices. The API can be used to trigger operations offered through the secure storage functionality of the storage device in connection with a response to the request received 902 from the security tool. For instance, the disk access security agent can cause 906, for instance, through a call to the API, one or more security operations to be performed at the storage device using the secure storage functionality. Such security operations can be make use of secure storage operations such as a direct read, direct write, false data read, false write success, COW, SAW, logging, record locks, allowing and blocking read and write attempts, among other examples.

In the example of FIG. 9B, a locked or otherwise protected data record can be identified 908 in a secure-storage-enabled storage device. A direct read can be caused to be performed 910 to identify the actual values at the storage device directly from the storage device. The identified values can be communicated 912 to a security tool and instructions to modify the values of the record can be received 914 from the security tool in response. A direct write of the data records can be caused to be performed 916 to rewrite the actual values of the data record with values different from those returned in the results of the direct read.

Figure 9D:
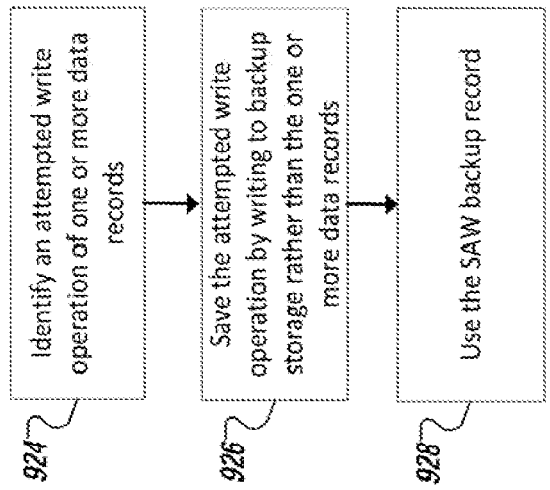
Figure 9C:
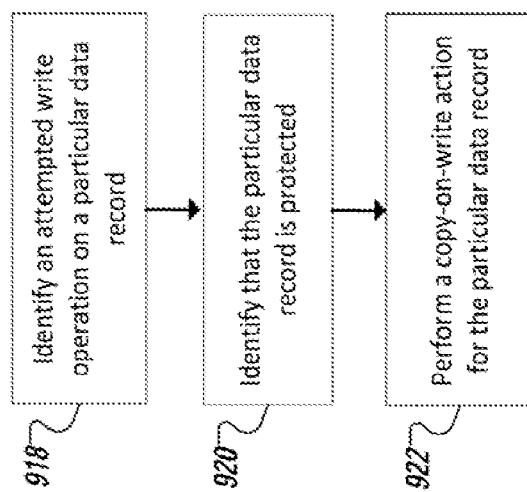

In the example of FIG. 9C, an attempted write to one or more data records of a secure-storage-enabled storage device is identified 918 (e.g., from a communication from a security tool monitoring at least portions of the records of the storage device). It can be identified 920 that the particular data record is protected or that one or more security policies apply to the particular data record. A security operation can be performed 922, such as a copy-on-write operation to create a copy of the contents of the data record prior to allowing the write attempt to write new data to the particular data record. The copied data can be backed-up in a COW data record and used to restore the values of the particular data record, for instance, through a direct write of the data back to the particular data record.

In the example of FIG. 9D, an attempted write of a particular data record of a secure-storage-enabled storage device can be identified 924 and trigger a SAW operation, for instance, based on a request or communication from a security tool identifying that the write attempt may be of a malicious or untrusted nature. For instance, the data that is attempted to be written in the attempted write can be saved 926 by writing the data to backup storage, such as a SAW data record. The SAW data record can then be used 928, for instance, to analyze the nature and source of the write attempt and determine whether the write attempt is or is not associated with malware, an error, or other undesirable condition.

Figure 9E:
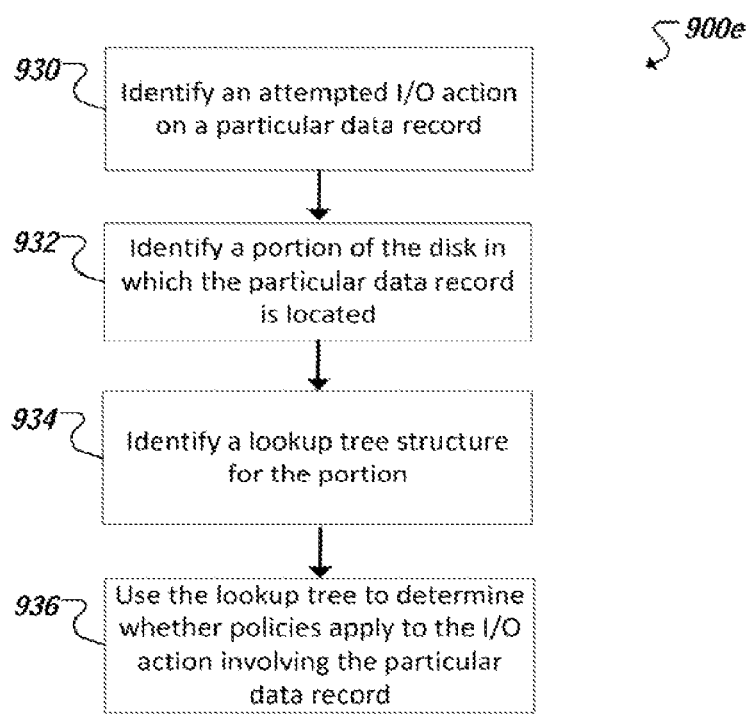

In the example of FIG. 9E, an attempted I/O operation can be identified 930 involving a particular data record of a storage device. A particular portion (e.g., an extent) of the storage device can be identified 932 that corresponds to the particular data record, such as a portion of the storage device in which the particular data record is located. A lookup tree structure can be identified 934 in a set of lookup tree structures that corresponds to the identified portion of the storage device. The lookup tree can then be used 936 to determine whether policies, rules, or functionality apply to the particular data record. In some instances, determining that one or more policies or rules apply to the particular data record can trigger one or more secure storage operations to be performed at the direction of a disk access security agent, such as a COW operation, SAW operation, false data read operation, false write success operation, blocking of the I/O operation, and so on.

Figure 11:
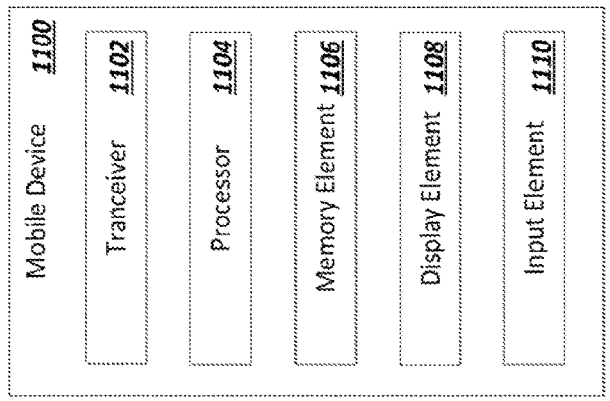
FIG. 11 is a block diagram of an exemplary mobile device system in accordance with one embodiment.
Figure 10:
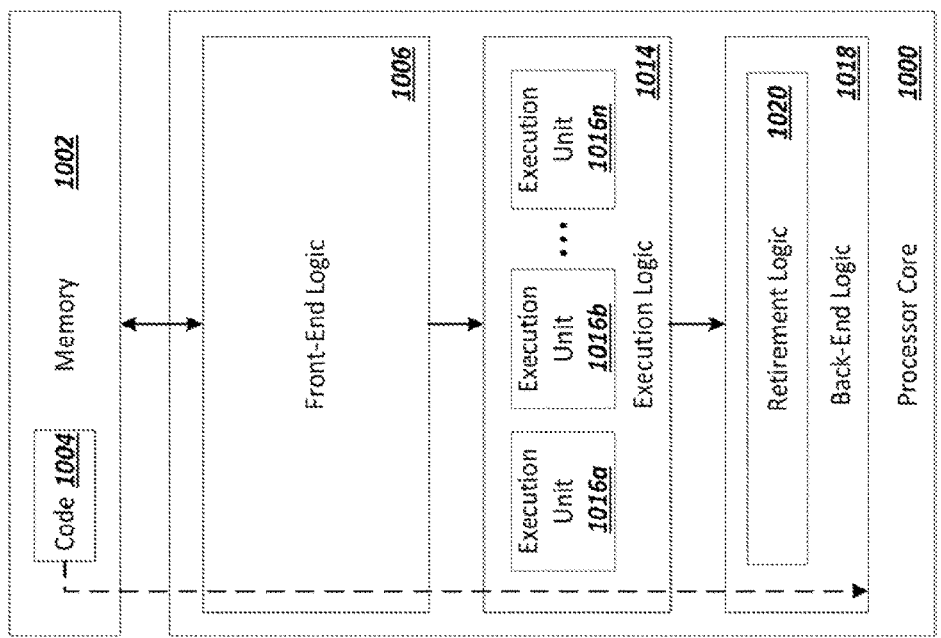
FIG. 10 is a block is a block diagram of an exemplary processor in accordance with one embodiment.
Figure 12:
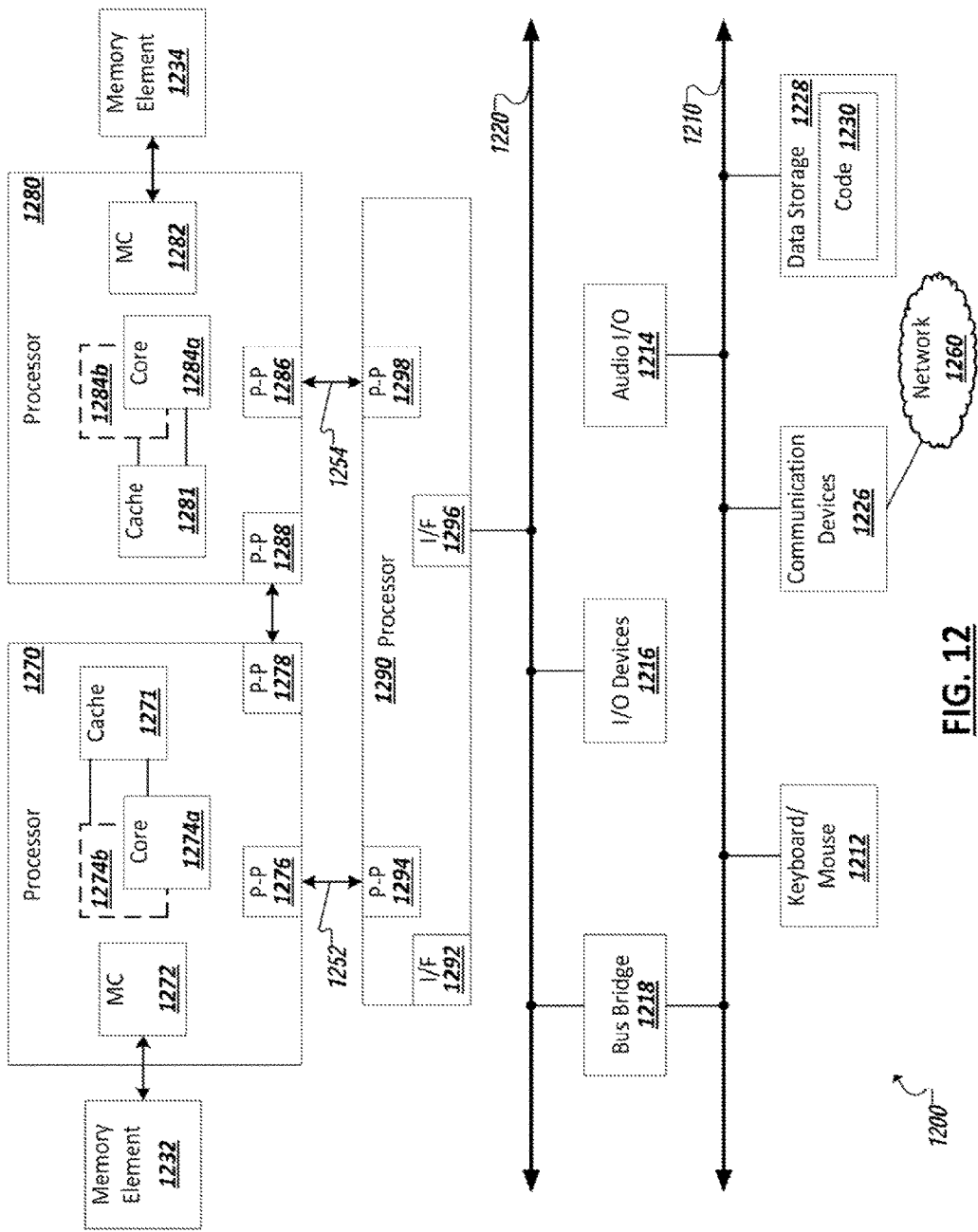
FIG. 12 is a block diagram of an exemplary computing system accordance with one embodiment.

FIGS. 10-12 are block diagrams of exemplary computer architectures that may be used in accordance with embodiments disclosed herein. Other computer architecture designs known in the art for processors, mobile devices, and computing systems may also be used. Generally, suitable computer architectures for embodiments disclosed herein can include, but are not limited to, configurations illustrated in FIGS. 10-12.

FIG. 10 is an example illustration of a processor according to an embodiment. Processor 1000 is an example of a type of hardware device that can be used in connection with the implementations above.

Processor 1000 may be any type of processor, such as a microprocessor, an embedded processor, a digital signal processor (DSP), a network processor, a multi-core processor, a single core processor, or other device to execute code. Although only one processor 1000 is illustrated in FIG. 10, a processing element may alternatively include more than one of processor 1000 illustrated in FIG. 10. Processor 1000 may be a single-threaded core or, for at least one embodiment, the processor 1000 may be multi-threaded in that it may include more than one hardware thread context (or "logical processor") per core.

FIG. 10 also illustrates a memory 1002 coupled to processor 1000 in accordance with an embodiment. Memory 1002 may be any of a wide variety of memories (including various layers of memory hierarchy) as are known or otherwise available to those of skill in the art. Such memory elements can include, but are not limited to, random access memory (RAM), read only memory (ROM), logic blocks of a field programmable gate array (FPGA), erasable programmable read only memory (EPROM), and electrically erasable programmable ROM (EEPROM).

Processor 1000 can execute any type of instructions associated with algorithms, processes, or operations detailed herein. Generally, processor 1000 can transform an element or an article (e.g., data) from one state or thing to another state or thing.

Code 1004, which may be one or more instructions to be executed by processor 1000, may be stored in memory 1002, or may be stored in software, hardware, firmware, or any suitable combination thereof, or in any other internal or external component, device, element, or object where appropriate and based on particular needs. In one example, processor 1000 can follow a program sequence of instructions indicated by code 1004. Each instruction enters a front-end logic 1006 and is processed by one or more decoders 1008. The decoder may generate, as its output, a micro operation such as a fixed width micro operation in a predefined format, or may generate other instructions, microinstructions, or control signals that reflect the original code instruction. Front-end logic 1006 also includes register renaming logic 1010 and scheduling logic 1012, which generally allocate resources and queue the operation corresponding to the instruction for execution.

Processor 1000 can also include execution logic 1014 having a set of execution units 1016a, 1016b, 1016n, etc. Some embodiments may include a number of execution units dedicated to specific functions or sets of functions. Other embodiments may include only one execution unit or one execution unit that can perform a particular function. Execution logic 1014 performs the operations specified by code instructions.

After completion of execution of the operations specified by the code instructions, back-end logic 1018 can retire the instructions of code 1004. In one embodiment, processor 1000 allows out of order execution but requires in order retirement of instructions. Retirement logic 1020 may take a variety of known forms (e.g., re-order buffers or the like). In this manner, processor 1000 is transformed during execution of code 1004, at least in terms of the output generated by the decoder, hardware registers and tables utilized by register renaming logic 1010, and any registers (not shown) modified by execution logic 1014.

Although not shown in FIG. 10, a processing element may include other elements on a chip with processor 1000. For example, a processing element may include memory control logic along with processor 1000. The processing element may include I/O control logic and/or may include I/O control logic integrated with memory control logic. The processing element may also include one or more caches. In some embodiments, non-volatile memory (such as flash memory or fuses) may also be included on the chip with processor 1000.

Referring now to FIG. 11, a block diagram is illustrated of an example mobile device 1100. Mobile device 1100 is an example of a possible computing system (e.g., a host or endpoint device) of the examples and implementations described herein. In an embodiment, mobile device 1100 operates as a transmitter and a receiver of wireless communications signals. Specifically, in one example, mobile device 1100 may be capable of both transmitting and receiving cellular network voice and data mobile services. Mobile services include such functionality as full Internet access, downloadable and streaming video content, as well as voice telephone communications.

Mobile device 1100 may correspond to a conventional wireless or cellular portable telephone, such as a handset that is capable of receiving "3G", or "third generation" cellular services. In another example, mobile device 1100 may be capable of transmitting and receiving "4G" mobile services as well, or any other mobile service.

Examples of devices that can correspond to mobile device 1100 include cellular telephone handsets and smartphones, such as those capable of Internet access, email, and instant messaging communications, and portable video receiving and display devices, along with the capability of supporting telephone services. It is contemplated that those skilled in the art having reference to this specification will readily comprehend the nature of modern smartphones and telephone handset devices and systems suitable for implementation of the different aspects of this disclosure as described herein. As such, the architecture of mobile device 1100 illustrated in FIG. 11 is presented at a relatively high level. Nevertheless, it is contemplated that modifications and alternatives to this architecture may be made and will be apparent to the reader, such modifications and alternatives contemplated to be within the scope of this description.

In an aspect of this disclosure, mobile device 1100 includes a transceiver 1102, which is connected to and in communication with an antenna. Transceiver 1102 may be a radio frequency transceiver. Also, wireless signals may be transmitted and received via transceiver 1102. Transceiver 1102 may be constructed, for example, to include analog and digital radio frequency (RF) 'front end' functionality, circuitry for converting RF signals to a baseband frequency, via an intermediate frequency (IF) if desired, analog and digital filtering, and other conventional circuitry useful for carrying out wireless communications over modern cellular frequencies, for example, those suited for 3G or 4G communications. Transceiver 1102 is connected to a processor 1104, which may perform the bulk of the digital signal processing of signals to be communicated and signals received, at the baseband frequency. Processor 1104 can provide a graphics interface to a display element 1108, for the display of text, graphics, and video to a user, as well as an input element 1110 for accepting inputs from users, such as a touchpad, keypad, roller mouse, and other examples. Processor 1104 may include an embodiment such as shown and described with reference to processor 1000 of FIG. 10.

In an aspect of this disclosure, processor 1104 may be a processor that can execute any type of instructions to achieve the functionality and operations as detailed herein. Processor 1104 may also be coupled to a memory element 1106 for storing information and data used in operations performed using the processor 1104. Additional details of an example processor 1104 and memory element 1106 are subsequently described herein. In an example embodiment, mobile device 1100 may be designed with a system-on-a-chip (SoC) architecture, which integrates many or all components of the mobile device into a single chip, in at least some embodiments.

FIG. 12 illustrates a computing system 1200 that is arranged in a point-to-point (PtP) configuration according to an embodiment. In particular, FIG. 12 shows a system where processors, memory, and input/output devices are interconnected by a number of point-to-point interfaces. Generally, one or more of the computing systems described herein may be configured in the same or similar manner as computing system 1200.

Processors 1270 and 1280 may also each include integrated memory controller logic (MC) 1272 and 1282 to communicate with memory elements 1232 and 1234. In alternative embodiments, memory controller logic 1272 and 1282 may be discrete logic separate from processors 1270 and 1280. Memory elements 1232 and/or 1234 may store various data to be used by processors 1270 and 1280 in achieving operations and functionality outlined herein.

Processors 1270 and 1280 may be any type of processor, such as those discussed in connection with other figures. Processors 1270 and 1280 may exchange data via a point-to-point (PtP) interface 1250 using point-to-point interface circuits 1278 and 1288, respectively. Processors 1270 and 1280 may each exchange data with a chipset 1290 via individual point-to-point interfaces 1252 and 1254 using point-to-point interface circuits 1276, 1286, 1294, and 1298. Chipset 1290 may also exchange data with a high-performance graphics circuit 1238 via a high-performance graphics interface 1239, using an interface circuit 1292, which could be a PtP interface circuit. In alternative embodiments, any or all of the PtP links illustrated in FIG. 12 could be implemented as a multi-drop bus rather than a PtP link.

Chipset 1290 may be in communication with a bus 1220 via an interface circuit 1296. Bus 1220 may have one or more devices that communicate over it, such as a bus bridge 1218 and I/O devices 1216. Via a bus 1210, bus bridge 1218 may be in communication with other devices such as a keyboard/mouse 1212 (or other input devices such as a touch screen, trackball, etc.), communication devices 1226 (such as modems, network interface devices, or other types of communication devices that may communicate through a computer network 1260), audio I/O devices 1214, and/or a data storage device 1228. Data storage device 1228 may store code 1230, which may be executed by processors 1270 and/or 1280. In alternative embodiments, any portions of the bus architectures could be implemented with one or more PtP links.

The computer system depicted in FIG. 12 is a schematic illustration of an embodiment of a computing system that may be utilized to implement various embodiments discussed herein. It will be appreciated that various components of the system depicted in FIG. 12 may be combined in a system-on-a-chip (SoC) architecture or in any other suitable configuration capable of achieving the functionality and features of examples and implementations provided herein.

The following examples pertain to embodiments in accordance with this Specification. One or more embodiments may provide an apparatus, a system, a machine readable storage, a machine readable medium, and a method to receive a request from a security tool relating to an event involving data records in a storage device, use an application programming interface (API) to interface with secure storage functionality of the storage device enabling a set of secure storage operations, and cause a security operation to be performed at the storage device involving the data records based at east in part on the request.

In at least one example, the API can facilitate a set of secure storage functionality common to each of a host-based secure storage capability, a chipset-based secure storage capability, and the firmware-based secure storage capability.

In at least one example, the set of secure storage operations can include a direct read operation.

In at least one example, the security operation can include a direct read of a particular one of the data records. Content of the particular data obtained through the direct read can be communicated to the security tool, and causing the security operation to be performed can include causing the particular data record to be rewritten through a direct write operation.

In at least one example, the set of secure storage operations can include a direct write operation.

In at least one example, the set of secure storage operations can include a copy-on-write operation.

In at least one example, the security operation can include a copy-on-write operation and causing the security operation to be performed can include causing an attempted write operation of a particular one of the data records to be identified and data of the one or more data records to be copied to a copy-on-write backup prior to allowing the attempted write operation.

In at least one example, causing the security operation to be performed can include causing the particular data record, following the attempted write operation, to be remediated by replacing data of the written-to particular data record with data of the copy-on-write backup.

In at least one example, the data of the written-to particular data record can be replaced with the data of the copy-on-write backup through a direct write operation.

In at least one example, the set of secure storage operations can include a save-attempted-write operation.

In at least one example, the security operation can include a save-attempted-write operation, the request can be used to identify an attempted write operation of a particular one of the data records, and causing the security operation to be performed can include causing the attempted write operation to be saved by disallowing the attempted write operation on the particular record and causing the write operation to be performed instead on a save-attempted-write (SAW) record.

In at least one example, causing the security operation to be performed can include causing a response to be generated to a read-back request of the particular data record with a false data read incorporating contents of the written-to SAW record.

In at least one example, causing the security operation to be performed can include causing the attempted write operation to be allowed after saving the attempted write operation, and using contents of the SAW record to allow the attempted write operation.

In at least one example, the set of secure storage operations can include a false data read operation.

In at least one example, the set of secure storage operations can include a data range lockdown operation.

In at least one example, the set of secure storage operations can include each of a direct read operation, a direct write operation, an allow write operation, and a block write operation. The set can further include a false data read operation and a false write success operation.

In at least one example, feedback data can be received from the secure storage device via the API, the feedback data describing results of the security operation. The feedback data can be included in a callback, a log generated by the secure storage platform, or another form.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a sub combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program: components and systems can generally be integrated together in a single software product or packaged into multiple software products.

Thus, particular embodiments of the subject matter have been described, Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results.

The invention claimed is:

1. At least one non-transitory, machine-accessible storage medium having instructions stored thereon, wherein the instructions, when executed on a machine, cause the machine to perform a method comprising:
   identifying an attempted input/output (I/O) action on a data record of a storage device construed as a plurality of sections;
   identifying a section of the plurality of sections of the storage device in which the data record is located;
   identifying a lookup tree structure for the section, based on a determination that a bit mask or a flag indicates that a policy pertains to a range within the section;
   when the bit mask or the flag indicates that a protected range does not exist within the section of the storage device, skipping a search of the lookup tree structure;
   when the bit mask or the flag indicates that the protected range does exist within the section of the storage device, searching the lookup tree structure to determine whether the policy applies to the I/O action involving the data record; and
   denying the I/O action, based on the policy.

2. The storage medium of claim 1, the method further comprising:
   determining whether the policy has been defined for the data record, based on the bit mask.

3. The storage medium of claim 2, wherein the bit mask includes a plurality of bits indicating a state of protection ranges within the section of the storage device.

4. The storage medium of claim 1, the method further comprising:
   performing a security operation, wherein the searching triggers the performing.

5. The storage medium of claim 4, wherein the security operation is one of a copy-on-write operation, a save-attempted-write operation, a false data read operation, a false write success operation, or a blocking of the I/O operation.

6. The storage medium of claim 1, wherein the lookup tree structure includes nodes identifying whether the policy applies to a data record range within the section of the storage device.

7. A method, comprising:
   identifying an attempted input/output (I/O) action on a data record of a storage device construed as a plurality of sections;
   identifying a section of the plurality of sections of the storage device in which the data record is located;
   identifying a lookup tree structure for the section, based on a determination that a bit mask or a flag indicates that a policy pertains to a range within the section;
   when the bit mask or the flag indicates that a protected range does not exist within the section of the storage device, skipping a search of the lookup tree structure;
   when the bit mask or the flag indicates that the protected range does exist within the section of the storage device, searching the lookup tree structure to determine whether the policy applies to the I/O action involving the data record; and
   denying the I/O action, based on the policy.

8. The method of claim 7, further comprising:
   determining whether the policy has been defined for the data record, based on the bit mask.

9. The method of claim 8, wherein the bit mask includes a plurality of bits indicating a state of protection ranges within the section of the storage device.

10. The method of claim 7, further comprising:
    performing a security operation, wherein the searching triggers the performing.

11. The method of claim 10, wherein the security operation is one of a copy-on-write operation, a save-attempted-write operation, a false data read operation, a false write success operation, or a blocking of the I/O operation.

12. The method of claim 7, wherein the lookup tree structure includes nodes identifying whether the policy applies to a data record range within the section of the storage device.

13. A system, comprising:
    a processor device; and
    logic, when executed by the processor device, to
       identify an attempted input/output (I/O) action on a data record of a storage device construed as a plurality of sections;
       identify a section of the plurality of sections of the storage device in which the data record is located;
       identify a lookup tree structure for the section, based on a determination that a bit mask or a flag indicates that a policy pertains to a range within the section;
       when the bit mask or the flag indicates that a protected range does not exist within the section of the storage device, skip a search of the lookup tree structure;
       when the bit mask or the flag indicates that the protected range does exist within the section of the storage device, search the lookup tree structure to determine whether the policy applies to the I/O action involving the data record; and
       denying the I/O action, based on the policy.

14. The system of claim 13, wherein the logic further is to determine whether the policy has been defined for the data record, based on the bit mask.

15. The system of claim 14, wherein the bit mask includes a plurality of bits indicating a state of protection ranges within the section of the storage device.

16. The system of claim 13, wherein the logic further is to perform a security operation, and a search of the lookup tree structure triggers the security operation.

17. The system of claim 16, wherein the security operation is one of a copy-on-write operation, a save-attempted-write operation, a false data read operation, a false write success operation, or a blocking of the I/O operation.

18. The system of claim 13, wherein the lookup tree structure includes nodes identifying whether the policy applies to a data record range within the section of the storage device.

* * * * *

UNITED STATES PATENT AND TRADEMARK OFFICE
CERTIFICATE OF CORRECTION

PATENT NO. : 10,360,398 B2  
APPLICATION NO. : 15/614836  
DATED : July 23, 2019  
INVENTOR(S) : Atul Kabra et al.

Page 1 of 1

It is certified that error appears in the above-identified patent and that said Letters Patent is hereby corrected as shown below:

In the Drawings

On sheet 3 of 14, in FIG. 3, Line 1, Reference Numeral 348, delete "Flrmware" and insert -- Firmware --, therefor.

Signed and Sealed this  
Tenth Day of September, 2019

Andrei Iancu  
*Director of the United States Patent and Trademark Office*